United States Patent
Shoda et al.

(10) Patent No.: US 12,122,861 B2
(45) Date of Patent: Oct. 22, 2024

(54) MULTI-COMPONENT COPOLYMER, RUBBER COMPOSITION, RESIN COMPOSITION, TIRE, AND RESIN PRODUCT

(71) Applicant: BRIDGESTONE CORPORATION, Tokyo (JP)

(72) Inventors: Yasuhiro Shoda, Tokyo (JP); Shun Tanemura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 540 days.

(21) Appl. No.: 17/607,147

(22) PCT Filed: Apr. 21, 2020

(86) PCT No.: PCT/JP2020/017251
§ 371 (c)(1),
(2) Date: Oct. 28, 2021

(87) PCT Pub. No.: WO2020/235285
PCT Pub. Date: Nov. 26, 2020

(65) Prior Publication Data
US 2022/0213240 A1    Jul. 7, 2022

(30) Foreign Application Priority Data

May 17, 2019    (JP) ................................ 2019-093936

(51) Int. Cl.
*C08F 210/02*      (2006.01)
*B60C 1/00*        (2006.01)

(52) U.S. Cl.
CPC .............. *C08F 210/02* (2013.01); *B60C 1/00* (2013.01)

(58) Field of Classification Search
CPC .... C08F 210/02; C08F 212/08; C08F 236/06; C08F 2500/32; C08F 2500/36; C08F 236/08
(Continued)

(56) References Cited

U.S. PATENT DOCUMENTS 10,053,530 B2   8/2018   Oishi et al.
10,669,364 B2   6/2020   Kimura et al.
(Continued)

FOREIGN PATENT DOCUMENTS

CN   106459311 A   2/2017
CN   108137766 A   6/2018
(Continued)

OTHER PUBLICATIONS

Extended European Search Report dated Apr. 26, 2023 in European Application No. 20809268.4.
(Continued)

*Primary Examiner* — Fred M Teskin
(74) *Attorney, Agent, or Firm* — Sughrue Mion, PLLC

(57) ABSTRACT

An object of the present disclosure is to provide a polymer exhibiting reduced heat generation in a low strain region. To achieve the object, the present disclosure provides a multi-component copolymer, comprising a non-conjugated olefin unit, a conjugated diene unit, and an aromatic vinyl unit, characterized in that: a ratio $[(C_{100\text{-}120}/C_{0\text{-}1000}) \times 100]$ of crystallinity $(C_{100\text{-}120})$ derived from the non-conjugated olefin unit at 100-120° C. with respect to crystallinity $(C_{0\text{-}100})$ derived from the non-conjugated olefin unit at 0-100° C., as measured by a differential scanning calorimeter (DSC), is 23% or less.

7 Claims, 1 Drawing Sheet

(58) Field of Classification Search
USPC .................................................. 526/79, 87
See application file for complete search history.

(56) References Cited

U.S. PATENT DOCUMENTS

| 2013/0197157 | A1 | 8/2013 | Kaita et al. |
| 2018/0282459 | A1 | 10/2018 | Kimura et al. |
| 2018/0291132 | A1 | 10/2018 | Kimura et al. |
| 2018/0298167 | A1* | 10/2018 | Horikawa ............. C08F 236/08 |

FOREIGN PATENT DOCUMENTS

| EP | 3725841 A1 * | 10/2020 | ............. C08L 23/08 |
| EP | 3 763 756 A1 | 1/2021 | |
| JP | 2001-522399 A | 11/2001 | |
| JP | 2014001279 A | 1/2014 | |
| JP | 2017075274 A | 4/2017 | |
| WO | 98/49211 A1 | 11/1998 | |
| WO | 2012/014455 A1 | 2/2012 | |
| WO | 2017/064859 A1 | 4/2017 | |
| WO | 2017/064862 A1 | 4/2017 | |
| WO | 2019/171679 A1 | 9/2019 | |
| WO | WO 2019/116656 A1 * | 12/2020 | ............. C08L 23/08 |

OTHER PUBLICATIONS

Guizhi Gao, et al., "New university chemistry experiment", China Environmental Science Press, First Edition, pp. 113-120 (12 pages).
Chinese Search Report dated Oct. 10, 2023 in Application No. 202080036332.9.
International Search Report for PCT/JP2020/017251 dated Jul. 21, 2020 [PCT/ISA/210].
Chinese Search Report dated Dec. 2, 2022 in Chinese Application No. 202080036332.9.
International Preliminary Report on Patentability dated Nov. 16, 2021 with a Translation of the Written Opinion of the International Searching Authority in Application No. PCT/JP2020/017251.

* cited by examiner

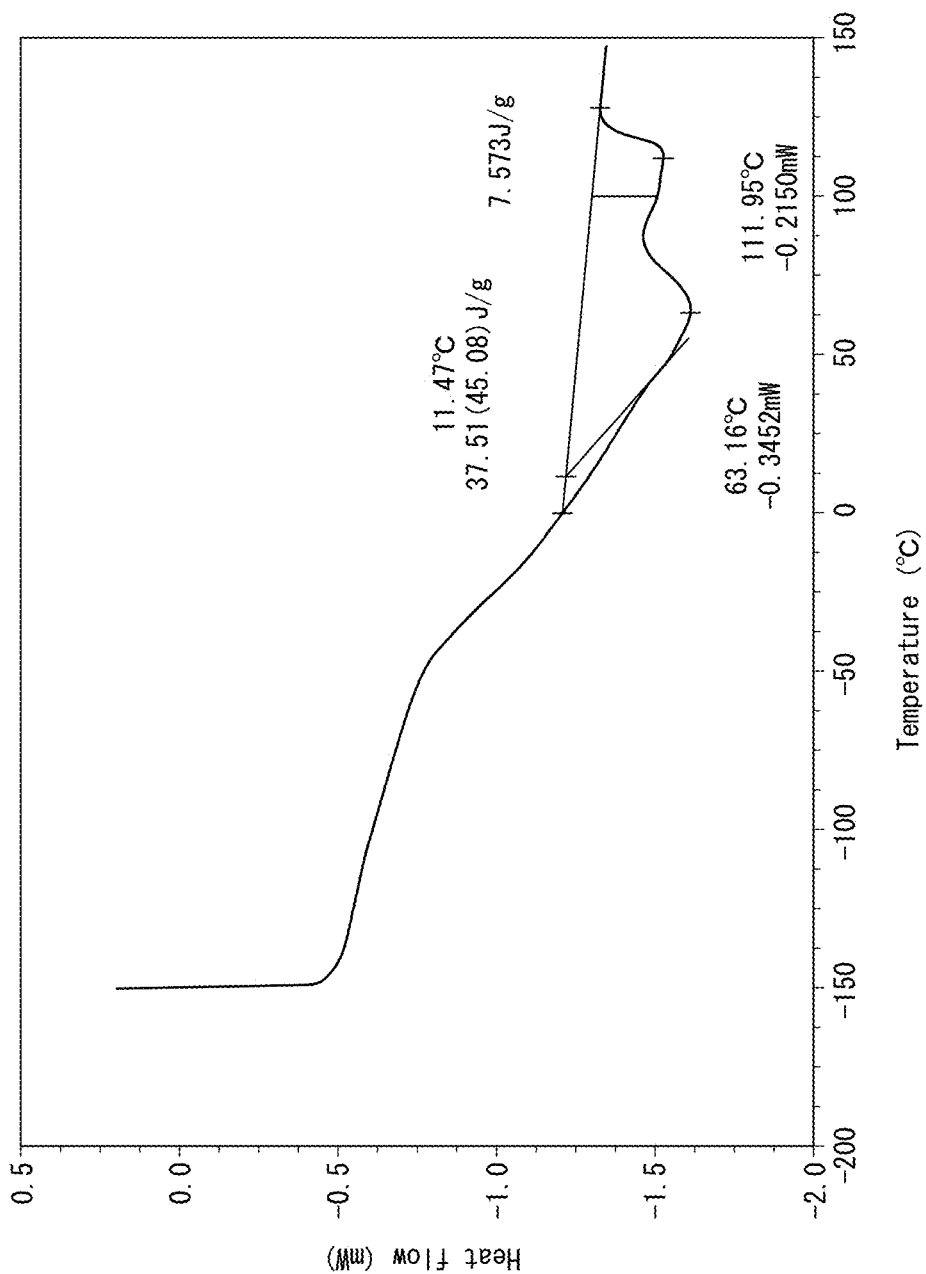

MULTI-COMPONENT COPOLYMER, RUBBER COMPOSITION, RESIN COMPOSITION, TIRE, AND RESIN PRODUCT

CROSS REFERENCE TO RELATED APPLICATIONS

This application is a National Stage of International Application No. PCT/JP2020/017251 filed Apr. 21, 2020, claiming priority based on Japanese Patent Application No. 2019-093936 filed May 17, 2019.

TECHNICAL FIELD

The present invention relates to a multi-component copolymer, a rubber composition, a resin composition, a tire, and a resin product.

BACKGROUND ART

In general, a rubber article (such as a tire, a conveyor belt, a rubber damper, quake-absorbing rubber or the like) and a resin product are required to be excellent in durability (fracture resistance, wear resistance, resistance to crack growth, and the like) and weatherproofness. A variety of polymers, and rubber compositions and resin compositions respectively containing the polymers, have been developed to satisfy such a demand of a rubber article and a resin product as described above.

For example, PTL 1 discloses a copolymer of a conjugated diene compound and a non-conjugated olefin, wherein a conjugated diene unit (a portion derived from the conjugated diene compound) thereof has a cis-1,4 bond content of greater than 70.5 mol % and the non-conjugated olefin is contained in an amount of 10 mol % or more. PTL 1 also discloses that the copolymer is used for manufacturing a rubber composition being excellent in crack growth resistance and weatherproofness.

CITATION LIST

Patent Literature

PTL 1: WO2012/014455

SUMMARY OF THE INVENTION

Technical Problems

However, PTL 1 fails to discuss a chain length of a non-conjugated olefin unit of the copolymer in spite of the fact that a chain length of a non-conjugated olefin unit of the copolymer is an important factor affecting heat generating property in a low strain region of the copolymer.

In view of this, an object of the present disclosure is to provide a polymer exhibiting reduced heat generation in a low strain region.

Further, another object of the present disclosure is to provide a rubber composition, a resin composition, a tire, and a resin product each containing the polymer and exhibiting reduced heat generation in a low strain region.

A polymer of the present disclosure which has been contrived to solve the aforementioned problems is a multi-component polymer and the primary features thereof are as follows.

A multi-component copolymer of the present disclosure is a multi-component copolymer comprising a non-conjugated olefin unit, a conjugated diene unit, and an aromatic vinyl unit, characterized in that:

a ratio $[(C_{100-120}/C_{0-100}) \times 100]$ of crystallinity ($C_{100-120}$) derived from the non-conjugated olefin unit at 100-120° C. with respect to crystallinity ($C_{0-100}$) derived from the non-conjugated olefin unit at 0-100° C., as measured by a differential scanning calorimeter (DSC), is 23% or less.

The multi-component copolymer of the present disclosure described above exhibits reduced heat generation in a low strain region.

In a preferable example of the multi-component copolymer of the present disclosure, said crystallinity ($C_{0-100}$) derived from the non-conjugated olefin unit at 0-100° C. is 10% or more. Fracture resistance of the multi-component copolymer improves in this case.

In another preferable example of the multi-component copolymer of the present disclosure, a content of the non-conjugated olefin unit is in the range of 40 to 97 mol %, a content of the conjugated diene unit is in the range of 1 to 50 mol %, and a content of the aromatic vinyl unit is in the range of 2 to 35 mol %. Fracture resistance and weatherproofness of the multi-component copolymer improve in this case.

In the multi-component copolymer of the present disclosure, the melting point thereof measured by a differential scanning calorimeter (DSC) is preferably in the range of 50 to 90° C. Fracture resistance and workability of the multi-component copolymer improve in this case.

In the multi-component copolymer of the present disclosure, the glass transition temperature thereof measured by a differential scanning calorimeter (DSC) is preferably 0° C. or lower. Workability of the multi-component copolymer improves in this case.

In the multi-component copolymer of the present disclosure, it is preferable that a main chain thereof is constituted exclusively of an acyclic structure. Fracture resistance of the multi-component copolymer improves in this case.

A rubber composition of the present disclosure is characterized in that it contains the multi-component copolymer described above. The rubber composition of the present disclosure exhibits reduced heat generation in a low strain region.

A resin composition of the present disclosure is characterized in that it contains the multi-component copolymer described above. The resin composition of the present disclosure exhibits reduced heat generation in a low strain region.

In the present disclosure, a "rubber composition" represents a composition having rubber-like elasticity at the room temperature and is distinguished from a "resin composition" representing a composition which is relatively hard and does not have rubber-like elasticity at the room temperature.

A tire of the present disclosure is characterized in that it uses the rubber composition described above. The tire of the present disclosure exhibits reduced heat generation in a low strain region and has low rolling resistance.

A resin product of the present disclosure is characterized in that it uses the resin composition described above. The resin product of the present disclosure exhibits reduced heat generation.

According to the present disclosure, it is possible to provide a multi-component copolymer exhibiting reduced heat generation in a low strain region. Further, according to the present disclosure, it is possible to provide a rubber composition, a resin composition, a tire, and a resin product each exhibiting reduced heat generation in a low strain region.

BRIEF DESCRIPTION OF THE DRAWINGS

In the accompanying drawing, wherein:
The Figure is a DSC chart of a multi-component copolymer of Example 1.

DETAILED DESCRIPTION

Hereinafter, a multi-component copolymer, a rubber composition, a resin composition, a tire, and a resin product of the present disclosure will be demonstratively described in detail based on embodiments thereof.

Multi-Component Copolymer

A multi-component copolymer of the present disclosure is a multi-component copolymer comprising a non-conjugated olefin unit, a conjugated diene unit, and an aromatic vinyl unit, characterized in that: a ratio $[(C_{100-120}/C_{0-100}) \times 100]$ of crystallinity ($C_{100-120}$) derived from the non-conjugated olefin unit at 100-120° C. with respect to crystallinity ($C_{0-100}$) derived from the non-conjugated olefin unit at 0-100° C., as measured by a differential scanning calorimeter (DSC), is 23% or less.

In the DSC measurement of a multi-component copolymer having a non-conjugated olefin unit, a conjugated diene unit, and an aromatic vinyl unit therein, an endothermic peak in the range of 100-120° C. is derived from a non-conjugated olefin unit having a long chain length and an endothermic peak in the range of 0-100° C. is derived from a non-conjugated olefin unit having a short chain length. A non-conjugated olefin unit having a short chain length functions as a pseudo crosslinking point in a molecular chain of the multi-component copolymer, thereby causing an effect of reducing hysteresis loss. In contrast, a long chain length of a non-conjugated olefin unit represents the presence of ample crystalline components (hard portions) in the multi-component copolymer, whereby the non-conjugated olefin unit having a long chain length functions like a filler in the same manner as crystalline polyethylene and facilitates generation of hysteresis loss even by low strain. In this respect, a ratio $[(C_{100-120}/C_{0-100}) \times 100]$ of crystallinity ($C_{100-120}$) derived from the non-conjugated olefin unit at 100-120° C. with respect to crystallinity ($C_{0-100}$) derived from the non-conjugated olefin unit at 0-100° C., as measured by a DSC, is 23% or less in the multi-component copolymer of the present disclosure. That is, a proportion of a non-conjugated olefin unit having a long chain length is low, while a proportion of a non-conjugated olefin unit having a short chain length is high, whereby relatively little hysteresis loss is generated by low strain and thus heat generation at a low strain region is reduced in the multi-component copolymer of the present disclosure.

Further, in the multi-component copolymer containing a non-conjugated olefin unit of the present disclosure, a crystalline component derived from the non-conjugated olefin unit collapses by high strain applied thereto so that the multi-component copolymer can dissipate energy. That is, the multi-component copolymer of the present disclosure has a high capacity of dissipating energy at a high strain region, thereby well suppressing fracture which would be caused by high strain, by the superior dissipation of energy, and thus exhibiting satisfactory fracture resistance.

A crystalline component in the multi-component copolymer constitutes a hard portion of the multi-component copolymer. Therefore, addition of a multi-component copolymer containing by a large content a non-conjugated olefin unit having a long chain length, to a rubber composition and a resin composition, deteriorates workability in the mixing and kneading process. However, the multi-component copolymer of the present disclosure, having a small content of a non-conjugated olefin unit having a long chain length, can reliably exhibit satisfactory workability in the mixing and kneading process when the multi-component copolymer is blended with a rubber composition or a resin composition.

In the multi-component copolymer of the present disclosure, a ratio $[(C_{100-120}/C_{0-100}) \times 100]$ of the crystallinity ($C_{100-120}$) with respect to the crystallinity ($C_{0-100}$) is to be 23% or less. However, the ratio $[(C_{100-120}/C_{0-100}) \times 100]$ is preferably 22% or less and more preferably 21% or less in terms of further reducing heat generation in a low strain region. The lower limit of the ratio $[(C_{100-120}/C_{0-100}) \times 100]$, which is not particularly limited, is generally $\geq 5.0\%$ or $\geq 4.0\%$ or $\geq 3.0\%$ or $\geq 2.0\%$ or $\geq 1.0\%$ or $\geq 0.1\%$. The lower limit of the ratio $[(C_{100-120}/C_{0-100}) \times 100]$ may be 0%.

In the present disclosure, each of the crystallinity ($C_{100-120}$) and the crystallinity ($C_{0-100}$) represents a value measured according to the method described in Examples.

In the multi-component copolymer of the present disclosure, crystallinity ($C_{100-120}$) derived from the non-conjugated olefin unit at 100-120° C., as measured by a differential scanning calorimeter (DSC), is preferably 4.0% or less, more preferably 2.5% or less, and still more preferably 1.0 or less. The lower limit of the crystallinity ($C_{100-120}$) is not particularly limited and may be 0%. The lower crystallinity ($C_{100-120}$) derived from the non-conjugated olefin unit at 100-120° C., as measured by a DSC, represents the shorter chain length of the non-conjugated olefin unit, thus the more reduced heat generation in a low strain region and the better workability in the mixing and kneading process when the multi-component copolymer is blended with a rubber composition or a resin composition.

In the multi-component copolymer of the present disclosure, crystallinity ($C_{0-100}$) derived from the non-conjugated olefin unit at 0-100° C., as measured by a differential scanning calorimeter (DSC), is preferably 10% or more, more preferably 15% or more, and still more preferably 16% or more. The upper limit of the crystallinity ($C_{0-100}$), although it is not particularly limited, is generally 50% or less. In the multi-component copolymer of the present disclosure, a crystalline component derived from a non-conjugated olefin unit collapses by high strain applied thereto so that the multi-component copolymer can dissipate energy, as described above. Setting the crystallinity ($C_{0-100}$) to be 10% or more reliably enhances the capacity of dissipating energy in a high strain region, thereby improving fracture resistance of the multi-component copolymer, in this regard.

The multi-component copolymer of the present disclosure, containing at least a non-conjugated olefin unit, a conjugated diene unit and an aromatic vinyl unit, may either consist exclusively of a non-conjugated olefin unit, a conjugated diene unit and an aromatic vinyl unit or further contain another monomer unit.

The non-conjugated olefin unit is a structural unit derived from a non-conjugated olefin compound as a monomer. A "non-conjugated olefin compound" represents an aliphatic unsaturated hydrocarbon compound having at least one carbon-carbon double bond in the present disclosure. In a case where the non-conjugated olefin compound has two or more carbon-carbon double bonds, the carbon-carbon double bonds are not conjugated. Type of the non-conjugated olefin compound is not particularly restricted but the non-conjugated olefin compound preferably has two to ten carbon atoms. Specific examples of the non-conjugated olefin compound described above include: α-olefin such as ethylene, propylene, 1-butene, 1-pentene, 1-hexene, 1-heptene, 1-octene, and the like; heteroatom-substituted alkene compound such as vinyl pivalate, 1-phenylthio ethene, N-vinylpyrrolidone; and the like. Either a single type or combination of two or more types of these examples may be used as the non-conjugated olefin compound. The non-conjugated olefin compound as a monomer of the multi-component copolymer is preferably an acyclic non-conjugated olefin compound in terms of improving weatherproofness of a rubber composition, a resin composition or the like using the resulting multi-component copolymer. The acyclic non-conjugated olefin compound is preferably α-olefin and particularly preferably ethylene. An acyclic non-conjugated olefin compound like α-olefin, ethylene in particular, has a double bond at α-position of the olefin, whereby the compound can be effectively polymerized with a conjugated diene compound described below and can also further improve weatherproofness of a rubber composition, a resin composition or the like using the resulting multi-component copolymer.

In the multi-component copolymer of the present disclosure, the non-conjugated olefin unit is preferably an acyclic non-conjugated olefin unit. Weatherproofness of a rubber composition, a resin composition or the like using the resulting multi-component copolymer improves when the non-conjugated olefin unit is an acyclic non-conjugated olefin unit.

In the multi-component copolymer of the present disclosure, it is particularly preferable that the non-conjugated olefin unit is constituted of only an ethylene unit. In a case where the non-conjugated olefin unit is constituted of only an ethylene unit, a non-conjugated olefin compound from which the non-conjugated olefin unit is derived, i.e. ethylene, is easily available and thus production cost of the multi-component copolymer can be reduced.

In the multi-component copolymer of the present disclosure, a content of the non-conjugated olefin unit is preferably≥40 mol %, more preferably≥45 mol %, still more preferably≥55 mol %, particularly preferably≥60 mol %, and preferably≤97 mol %, more preferably≤95 mol %, still more preferably≤90 mol %. When a content of the non-conjugated olefin unit is ≥40 mol % of the multi-component copolymer in its entirety, the multi-component copolymer exhibits high energy-dissipating ability in a high strain region thereof. Further, a content of the conjugated diene unit and/or the aromatic vinyl unit decreases consequently in this case, thereby improving weatherproofness and/or fracture resistance (breaking strength (Tb) in particular) at high temperature of the multi-component copolymer. When a content of the non-conjugated olefin unit is ≤97 mol %, a content of the conjugated diene unit and/or the aromatic vinyl unit increases as a result, thereby improving fracture resistance (elongation at break (Eb) in particular) at high temperature of the multi-component copolymer. The content of the non-conjugated olefin unit is preferably in the range of 40-97 mol %, more preferably in the range of 45-95 mol %, and still more preferably in the range of 55-90 mol %, of the multi-component copolymer in its entirety.

The conjugated diene unit is a structural unit derived from a conjugated diene compound as a monomer. A "conjugated diene compound" represents a diene compound in which double bonds are conjugated in the present disclosure. Although type of the conjugated diene compound is not particularly restricted, the conjugated diene compound preferably has four to eight carbon atoms. Specific examples of the conjugated diene compound include 1,3-butadiene, isoprene, 1,3-pentadiene, 2,3-dimethyl-1,3-butadiene, and the like. 1,3-butadiene and isoprene are preferable and 1,3-butradiene is particularly preferable among these examples in terms of availability. Either a single type or combination of two or more types of these examples may be used as the conjugated diene compound.

In the multi-component copolymer of the present disclosure, the conjugated diene unit preferably includes 1,3-butadiene unit and/or isoprene unit. When the conjugated diene unit includes 1,3-butadiene unit and/or isoprene unit, a conjugated diene compound from which the conjugated diene unit is derived (i.e., 1,3-butadiene, isoprene) is easily available and thus production cost of the multi-component copolymer can be reduced. Further, in the multi-component copolymer of the present disclosure, it is particularly preferable that the conjugated diene unit is constituted exclusively of 1,3-butadiene unit. When the conjugated diene unit is constituted exclusively of 1,3-butadiene unit, a conjugated diene compound from which the conjugated diene unit is derived (i.e., 1,3-butadiene) is particularly easily available and thus production cost of the copolymer can be further reduced.

In the multi-component copolymer of the present disclosure, a content of the conjugated diene unit is preferably≥1 mol %, more preferably≥3 mol %, and preferably≤50 mol %, more preferably≤40 mol %, still more preferably≤30 mol %, yet still more preferably≤25 mol %, particularly preferably≤15 mol %. A content of the conjugated diene unit, of ≥1 mol % of the multi-component copolymer in its entirety, is preferable because then vulcanization of the multi-component copolymer is significantly facilitated and a rubber composition and a tire being excellent in elongation can be obtained. A content of the conjugated diene unit, of ≤50 mol % of the multi-component copolymer in its entirety, achieves excellent weatherproofness. A content of the conjugated diene is preferably in the range of 1-50 mol % and more preferably in the range of 3-40 mol % of the of the multi-component copolymer in its entirety.

The aromatic vinyl unit is a structural unit derived from an aromatic vinyl compound as a monomer. An "aromatic vinyl compound" represents an aromatic compound which has been substituted by at least vinyl group in the present disclosure. When the multi-component copolymer contains an aromatic vinyl unit, chain lengths of the non-conjugated olefin units can be more easily reduced than otherwise. Although type of the aromatic vinyl compound is not particularly restricted, the aromatic vinyl compound preferably has eight to ten carbon atoms. Examples of the aromatic vinyl compound include styrene, α-methylstyrene, o-methylstyrene, m-methylstyrene, p-methylstyrene, o, p-dimethyl styrene, o-ethylstyrene, m-ethylstyrene, p-ethylstyrene, and the like. Styrene is preferable among these examples in terms of easy availability. Either a single type or combination of two or more types of the examples may be used as the aromatic vinyl compound.

The multi-component copolymer of the present disclosure preferably includes a styrene unit as the aromatic vinyl unit. When the multi-component copolymer includes a styrene unit, an aromatic vinyl compound from which the aromatic vinyl unit is derived (i.e., styrene) is easily available and thus production cost of the multi-component copolymer can be reduced.

In the multi-component copolymer of the present disclosure, a content of the aromatic vinyl unit is preferably≥2 mol %, more preferably≥3 mol %, and preferably≤35 mol %, more preferably≤30 mol %, still more preferably≤25 mol %. A content of the aromatic vinyl unit of≥2 mol % enhances fracture resistance at high temperature. Effects caused by the non-conjugated olefin unit and the conjugated diene unit are conspicuous when a content of the aromatic vinyl unit is ≤35 mol %. A content of the aromatic vinyl unit is preferably in the range of 2-35 mol %, more preferably in the range of 3-30 mol %, and still more preferably in the range of 3-25 mol %, of the multi-component copolymer in its entirety.

It is preferable in the multi-component copolymer of the present disclosure that a content of the non-conjugated olefin unit is in the range of 40-97 mol %, a content of the conjugated diene unit is in the range of 1-50 mol %, and a content of the aromatic vinyl unit is in the range of 2-35 mol %. Fracture resistance and weatherproofness of a rubber composition, a resin composition or the like having the multi-component copolymer blended therein improve in this case.

In the multi-component copolymer of the present disclosure, a content of a butylene unit is preferably 0 mol %. Accordingly, since hydrogenated styrene-ethylene/butylene-styrene (SEBS) copolymer contains a butylene unit, the multi-component copolymer does not include SEBS when "a content of a butylene unit is 0 mol %" therein.

The number of monomer types of the multi-component copolymer is not particularly restricted as long as the multi-component copolymer includes a conjugated diene unit, a non-conjugated olefin unit and an aromatic vinyl unit therein. In other words, the multi-component copolymer may include an optional structural unit other than a conjugated diene unit, a non-conjugated olefin unit and an aromatic vinyl unit. However, a content of the optional structural unit is preferably≤30 mol %, more preferably≤20 mol %, still more preferably≤10 mol %, and particularly preferably 0 mol % in terms of obtaining an effect as desired. That is, it is particularly preferable that the multi-component copolymer does not contain any optional structural unit other than the essentially required units described above.

The multi-component copolymer of the present disclosure has a weight average molecular weight (Mw) in terms of polystyrene preferably in the range of 10,000 to 10,000,000, more preferably in the range of 100,000 to 9,000,000, and still more preferably in the range of 150,000 to 8,000,000. The weight average molecular weight (Mw) of the multi-component copolymer, of 10,000 or more, ensures that the multi-component copolymer has satisfactory mechanical strength and the Mw of the multi-component copolymer, of 10,000,000 or less, ensures good workability of the multi-component copolymer.

Further, the multi-component copolymer of the present disclosure has a number average molecular weight (Mn) in terms of polystyrene preferably in the range of 10,000 to 10,000,000, more preferably in the range of 50,000 to 9,000,000, and still more preferably in the range of 100,000 to 8,000,000. The number average molecular weight (Mn) of the multi-component copolymer, of 10,000 or more, ensures that the multi-component copolymer has satisfactory mechanical strength and the Mn of the multi-component copolymer, of 10,000,000 or less, ensures good workability of the multi-component copolymer.

Yet further, the multi-component copolymer of the present disclosure has a molecular weight distribution [Mw/Mn (the weight average molecular weight/the number average molecular weight)] preferably in the range of 1.00 to 4.00, more preferably in the range of 1.50 to 3.50, and still more preferably in the range of 1.80 to 3.00. It is possible to make physical properties of the multi-component copolymer satisfactorily uniform by setting the molecular weight distribution of the multi-component copolymer to be ≤4.00.

A weight average molecular weight (Mw), a number average molecular weight (Mn), and a molecular distribution (Mw/Mn) described above are determined, relative to those of polystyrene as a standard reference material, by gel permeation chromatography (GPC).

In the multi-component copolymer of the present disclosure, the melting point thereof measured by differential scanning calorimetry (DSC) is preferably in the range of 50° C. to 90° C. and more preferably in the range of 60° C. to 80° C. A degree of crystallinity of the multi-component copolymer increases and thus fracture resistance thereof further improves when the melting point of the multi-component copolymer is equal to or higher than 50° C. Workability improves when the melting point of the multi-component copolymer is equal to or lower than 90° C.

The melting point represents a value measured by using a differential scanning calorimeter according to JIS K 7121-1987 in the present disclosure.

In the multi-component copolymer of the present disclosure, endothermic energy at the endothermic peak thereof in the range of 0° C. to 120° C., measured by a differential scanning calorimeter (DSC), is preferably in the range of 10 J/g to 150 J/g and more preferably in the range of 30 J/g to 120 J/g. When the endothermic energy at the endothermic peak of the multi-component copolymer is ≥10 J/g, a degree of crystallinity of the multi-component copolymer is high enough and fracture resistance of the multi-component copolymer further improves. When the endothermic energy at the endothermic peak of the multi-component copolymer is ≤150 J/g, workability of the multi-component copolymer improves.

In the present disclosure, the "endothermic energy at the endothermic peak" represents a value of the endothermic energy at the endothermic peak, measured by using a differential scanning calorimeter according to JIS K 7121-1987 in the range of 0° C. to 120° C. in the $1^{st}$ run when a sample is heated from −150° C. to 150° C. at a temperature-increasing rate of 10° C./minute.

In the multi-component copolymer of the present disclosure, the glass transition temperature (Tg) measured by a differential scanning calorimeter (DSC) is preferably equal to or lower than 0° C. and more preferably in the range of −100° C. to −10° C. Workability improves when the glass transition temperature of the multi-component copolymer is equal to or lower than 0° C.

The "glass transition temperature" represents a value measured by using a differential scanning calorimeter according to JIS K 7121-1987 in the present disclosure.

It is preferable that a main chain of the multi-component copolymer of the present disclosure is constituted of only acyclic structures because then fracture resistance of the multi-component copolymer can be improved. NMR is employed as a primary measurement means for determining whether a main chain of the multi-component copolymer is constituted of only acyclic structures or not. Specifically, when a peak derived from a cyclic structure existing in a main chain (e.g., any of peaks appearing in a range of 10 ppm to 24 ppm in cases of three-membered, four-membered, and five-membered cyclic structures) is not observed, the result indicates that the main chain of the multi-component copolymer is constituted exclusively of acyclic structures.

The multi-component copolymer can be manufactured by a polymerization process using a non-conjugated olefin compound, a conjugated diene compound, and an aromatic vinyl compound as monomers and optionally a coupling process, a washing process and other processes.

In the present disclosure, it is preferable in manufacturing the multi-component copolymer to first charge only a non-conjugated olefin compound and an aromatic vinyl compound without adding a conjugated diene compound thereto and allow the two compounds thus charged to be polymerized under the presence of a polymerization catalyst, because a conjugated diene compound is generally more reactive than a non-conjugated olefin compound and an aromatic vinyl compound when in particular the catalyst composition described below is used, whereby it will presumably be difficult to cause the non-conjugated olefin compound and/or the aromatic vinyl compound to be satisfactorily polymerized under the presence of the conjugated diene compound. In this regard, it is generally also difficult due to the characteristics of the catalyst to cause the conjugated diene compound to be exclusively polymerized in advance and then cause the non-conjugated olefin compound and the aromatic vinyl compound to be polymerized additionally.

Any polymerization method such as solution polymerization, suspension polymerization, liquid-phase bulk polymerization, emulsion polymerization, vapor-phase polymerization, or solid-phase polymerization can be used for the polymerization process. In a case where a solvent is used in a relevant polymerization reaction, any solvent is acceptable as long as the solvent is inactive in the polymerization reaction. Examples of the solvent include toluene, cyclohexane, n-hexane, and the like.

The polymerization process may be carried out by either a single step or multiple (i.e., two or more) steps. The polymerization process carried out by a single step represents a process of effecting polymerization by bringing all monomers to be polymerized (i.e., anon-conjugated olefin compound, a conjugated diene compound, an aromatic vinyl compound and other monomer(s), preferably a non-conjugated olefin compound, a conjugated diene compound, and an aromatic vinyl compound) to simultaneous reactions. The polymerization process carried out by multiple steps includes: a process of forming a polymer by bringing a portion/all of one/two or more monomer(s) to polymerization reactions (the first polymerization step); and at least one process of then adding the remaining portion(s) of the first polymerization step monomer(s) and the remaining type/species of monomer(s) which have not been used in the first polymerization step, to the polymer formed in the first polymerization step, to complete polymerization (the second polymerization step to the final polymerization step). It is preferable that the polymerization process is carried out by multiple steps in manufacturing a multi-component copolymer in particular.

In the polymerization process, the relevant polymerization reactions are preferably carried out in an atmosphere of inert gas, desirably in an atmosphere of nitrogen gas or argon gas.

The temperature in the polymerization reactions, although it is not particularly restricted, is preferably in the range of −100° C. to 200° C. and may be around the room temperature, for example. It is possible to adjust the crystallinity ($C_{100-120}$) derived from the non-conjugated olefin unit at 100-120° C. and the crystallinity ($C_{0-100}$) derived from the non-conjugated olefin unit at 0-100° C. described above by controllably setting the polymerization temperature, as well as by selecting type and/or composition of the polymerization catalyst described below.

Pressure during the polymerization reactions is preferably in the range of 0.1 MPa to 10.0 MPa in terms of capturing a sufficient amount of a conjugated diene compound into the polymerization reaction system. Reaction time spared for the polymerization reactions is preferably in the range of 1 second to 10 days, for example, although it is not particularly restricted. The reaction time may be appropriately set depending on conditions such as type of the catalyst, polymerization temperature, and the like.

The polymerization reaction can be stopped by using a polymerization terminator such as methanol, ethanol, isopropanol in the aforementioned polymerization process of the conjugated diene compound.

The aforementioned polymerization process is carried out preferably by multiple steps and more preferably by: a first step of mixing a first monomer raw material including at least an aromatic vinyl compound with a polymerization catalyst, to obtain a polymerization mixture; and a second step of introducing a second monomer raw material including at least one selected from the group consisting of a conjugated diene compound, a non-conjugated olefin compound and an aromatic vinyl compound, to the polymerization mixture. It is still more preferable that the first monomer raw material does not include a conjugated diene compound but the second monomer raw material includes a conjugated diene compound.

The first monomer raw material for use in the first step may include a non-conjugated olefin compound, as well as an aromatic vinyl compound. Further, the first monomer raw material may contain either the entirety or a portion of the aromatic vinyl compound for use. It should be noted that a non-conjugated olefin compound is to be included in at least one of the first monomer raw material and the second monomer raw material.

The first step described above is preferably carried out in a reaction vessel in an atmosphere of inert gas, desirably in an atmosphere of nitrogen gas or argon gas. The temperature (the reaction temperature) in the first step, although it is not particularly restricted, is preferably in the range of −100° C. to 200° C. and may be around the room temperature, for example. Pressure during the first step, although it is not particularly restricted, is preferably in the range of 0.1 MPa to 10.0 MPa in terms of capturing a sufficient amount of an aromatic vinyl compound into the polymerization reaction system. Time (reaction time) spared for the first step is preferably in the range of 5 minutes to 500 minutes when the reaction temperature is set to be within the range of 25° C. to 80° C., for example, although the reaction time may be appropriately set depending on conditions such as type of the catalyst, reaction temperature, and the like.

Any polymerization method such as solution polymerization, suspension polymerization, liquid-phase bulk polymerization, emulsion polymerization, vapor-phase polymerization, or solid-phase polymerization can be used for a polymerization method for obtaining the polymerization mixture in the first step. In a case where a solvent is used in a relevant polymerization reaction, any solvent is acceptable as long as the solvent is inactive in the polymerization reaction. Examples of the solvent include toluene, cyclohexane, n-hexane, and the like.

The second monomer raw material for use in the second step preferably includes i) only a conjugated diene compound or ii) a conjugated diene compound and a non-conjugated olefin compound or iii) a conjugated diene compound and an aromatic vinyl compound or iv) a conjugated diene compound, a non-conjugated olefin compound, and an aromatic vinyl compound.

In a case where the second monomer raw material includes, other than a conjugated diene compound, at least one selected from the group consisting of a non-conjugated olefin compound and an aromatic vinyl compound, those monomer raw materials may be introduced into the polymerization mixture after mixing the monomer raw materials and a solvent with each other or, alternatively, the respective monomer raw materials may be introduced separately (without being mixed with each other) into the polymerization mixture. The respective monomer raw materials may be added either all together or one by one with a time lag therebetween. A method for introducing the second monomer raw material into the polymerization mixture in the second step is not particularly restricted but it is preferable to continuously add the second monomer raw material to the polymerization mixture with controlling or metering flow rates of the respective monomer raw materials thereof. In this regard, in a case where a monomer raw material which is in a gaseous state under the conditions of the polymerization reaction system (for example, ethylene or the like as a non-conjugated olefin compound which is in a gaseous state at the room temperature and at the standard atmospheric pressure) is used, the monomer raw material can be introduced into the polymerization reaction system at a prescribed pressure.

In the second step described above, the polymerization process is preferably carried out in a reaction vessel in an atmosphere of inert gas, desirably in an atmosphere of nitrogen gas or argon gas. The temperature (the reaction temperature) in the second step, although it is not particularly restricted, is preferably in the range of −100° C. to 200° C. and may be around the room temperature, for example. Too high reaction temperature may adversely affect selectivity of cis-1,4 bond of the conjugated diene unit in a reaction. Pressure in the second step, although it is not particularly restricted, is preferably in the range of 0.1 MPa to 10.0 MPa in terms of capturing a sufficient amount of monomers of a conjugated diene compound and the like into the polymerization reaction system. Time (reaction time) spared for the second step is preferably in the range of 0.1 hour to 10 days, for example. The reaction time may be appropriately set depending on conditions such as type of the polymerization catalyst, reaction temperature, and the like.

The polymerization reaction can be stopped by using a polymerization terminator such as methanol, ethanol, isopropanol in the second step.

In the present disclosure, the polymerization process of a conjugated diene compound, a non-conjugated olefin compound, and an aromatic vinyl compound described above preferably includes a process of polymerizing the respective monomers under the presence of at least one of the following components (A)-(F) as catalyst components. Use of at least one of the following components (A)-(F) as a catalyst component is preferable and use of at least two of the following (A)-(F) components in combination as a catalyst composition is more preferable in the polymerization process.

Component (A): a rare earth element compound or a reactant resulted from a reaction between the rare earth element compound and a Lewis base
Component (B): an organic metal compound
Component (C): aluminoxane
Component (D): an ionic compound
Component (E): a halogen compound Component (F): a compound having a cyclopentadiene skeleton, selected from the group consisting of substituted/unsubstituted cyclopentadiene (a compound having a cyclopentadienyl group), substituted/unsubstituted indene (a compound having an indenyl group), and substituted/unsubstituted fluorene (a compound having a fluorenyl group), which compound as the component (F) will occasionally be referred to simply as a "compound having a cyclopentadiene skeleton" hereinafter The components (A)-(F) will be described in detail hereinafter.

"A rare earth element compound or a reactant resulted from a reaction between the rare earth element compound and a Lewis base" as the component (A) described above specifically includes: i) a rare earth element compound or a reactant resulted from a reaction between the rare earth element compound and a Lewis base, which compound/reactant has a bond between a rare earth element and carbon (the compound/reactant will occasionally be referred to as "component (A-1)" hereinafter); and ii) a rare earth element compound or a reactant resulted from a reaction between the rare earth element compound and a Lewis base, which compound/reactant does not have a bond between a rare earth element and carbon (the compound/reactant will occasionally be referred to as "component (A-2)" hereinafter).

Examples of the component (A-1) include:

a metallocene complex represented by following general formula (I):

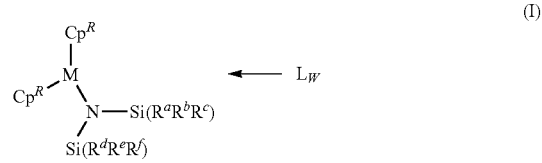

(In formula (I), M represents a lanthanoid element, scandium or yttrium; $Cp^R$s each independently represent an unsubstituted/substituted indenyl, $R^a$ to $R^f$ each independently represent a $C_{1-3}$ alkyl group or hydrogen atom; L represents a neutral Lewis base; and w represents an integer in the range of 0 to 3);

a metallocene complex represented by following general formula (II):

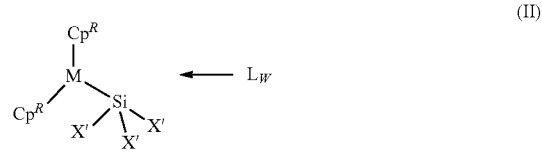

(In formula (II), M represents a lanthanoid element, scandium or yttrium; $Cp^R$s each independently represent an unsubstituted/substituted indenyl; X' represents hydrogen atom, halogen atom, alkoxy, thiolate, amino, silyl, or a $C_{1-20}$ monovalent hydrocarbon group; L represents a neutral Lewis base; and w represents an integer in the range of 0 to 3); and a half metallocene cation complex represented by following general formula (III):

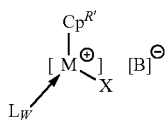

(III)

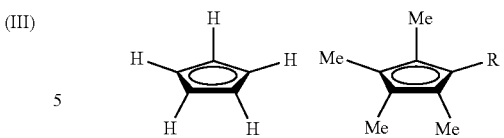

(In these structural formulae, R represents hydrogen atom, methyl or ethyl group.)

$Cp^{R'}$ having an indenyl ring as the base skeleton, as well as preferable examples thereof, in general formula (III) is defined in the same manner as $Cp^R$ in general formula (I) and $Cp^R$ in general formula (II).

$Cp^{R'}$ having a fluorenyl ring as the base skeleton in general formula (III) is represented as $C_{13}H_{9-x}R_x$ or $C_{13}H_{17-x}R_x$, wherein X is an integer in the range of 0 to 9 or 0 to 17; Rs preferably each independently represent hydrocarbyl or metalloid group; and the number of carbon atoms of the hydrocarbyl group is preferably in the range of 1 to 20, more preferably in the range of 1 to 10, and still more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl group and the like.

The core metal M in each of general formulae (I), (II) and (III) is a lanthanoid element, scandium or yttrium. The lanthanoid elements include the fifteen elements having atomic numbers 57-71 in the periodic table and any of these elements is acceptable. Preferable examples of the core metal M include samarium Sm, neodymium Nd, praseodymium Pr, gadolinium Gd, cerium Ce, holmium Ho, scandium Sc, and yttrium Y.

The metallocene complex represented by general formula (I) includes a silylamide ligand [—N(SiR$_3$)$_2$]. R groups included in the silylamide ligand (i.e., $R^a$ to $R^f$ in general formula (I)) each independently represent a $C_{1-3}$ alkyl group or a hydrogen atom. It is preferable that at least one of $R^a$ to $R^f$ is a hydrogen atom. The catalyst can be easily synthesized and a non-conjugated olefin compound and an aromatic vinyl compound are easily introduced due to relatively little steric hindrance around the silicon atom when at least one of $R^a$ to $R^f$ is a hydrogen atom. For similar reasons, it is more preferable that at least one of $R^a$ to $R^c$ is a hydrogen atom and at least one of $R^d$ to $R^f$ is a hydrogen atom. Methyl group is preferable as the alkyl group.

The metallocene complex represented by general formula (II) includes a silyl ligand [—SiX'$_3$]. X' groups included in the silyl ligand [—SiX'$_3$], as well as preferable examples thereof, are defined in the same manner as X group in general formula (III) described below.

In general formula (III), X is a group selected from the group consisting of hydrogen atom, halogen atom, alkoxy, Notate, amino, silyl, and a $C_{1-20}$ monovalent hydrocarbon groups. Acceptable examples of the halogen atom represented by X in general formula (III) include fluorine, chlorine, bromine and iodine atoms. Chlorine or bromine atom is preferable.

Examples of the alkoxy group represented by X in general formula (III) include: aliphatic alkoxy group such as methoxy, ethoxy, propoxy, n-butoxy, isobutoxy, sec-butoxy, tert-butoxy, and the like; and aryloxy group such as phenoxy, 2,6-di-tert-butylphenoxy, 2,6-diisopropylphenoxy, 2,6-dine- (In formula (III), M represents a lanthanoid element, scandium or yttrium; $Cp^{R'}$ represents an unsubstituted/substituted cyclopentadienyl, an unsubstituted/substituted indenyl or an unsubstituted/substituted fluorenyl; X represents hydrogen atom, halogen atom, alkoxy, thiolate, amino, silyl, or a $C_{1-20}$ monovalent hydrocarbon group; L represents a neutral Lewis base; w represents an integer in the range of 0 to 3); and [Br]$^-$ represents a non-coordinating anion).

$Cp^R$s are unsubstituted/substituted indenyls in the respective metallocene complexes represented by general formula (I) and general formula (II). $Cp^R$ having an indenyl ring as the base skeleton may be represented as $C_9H_{7-x}R_x$ or $C_9H_{11-x}R_x$, wherein X represents an integer in the range of 0 to 7 or 0 to 11; Rs preferably each independently represent hydrocarbyl or metalloid group; and the number of carbon atoms of the hydrocarbyl group is preferably in the range of 1 to 20, more preferably in the range of 1 to 10, and still more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl group, and the like. Specific examples of the substituted indenyl include 2-phenylindenyl, 2-methylindenyl, and the like. The two $Cp^R$s in general formula (I) may be of either the same type or different types. The two $Cp^R$s in general formula (II) may be of either the same type or different types.

$Cp^{R'}$ is an unsubstituted/substituted cyclopentadienyl, an unsubstituted/substituted indenyl or an unsubstituted/substituted fluorenyl group in the half metallocene cation complex represented by general formula (III). An unsubstituted/substituted indenyl group is preferable as $Cp^{R'}$ among these examples.

In general formula (III), $Cp^{R'}$ having a cyclopentadienyl ring as the base skeleton is represented as $C_5H_{5-x}R_x$, wherein X is an integer in the range of 0 to 5; Rs preferably each independently represent hydrocarbyl or metalloid group; and the number of carbon atoms of the hydrocarbyl group is preferably in the range of 1 to 20, more preferably in the range of 1 to 10, and still more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl group and the like. Specific examples of $Cp^{R'}$ having a cyclopentadienyl ring as the base skeleton include compounds represented by the following structural formulae:

opentylphenoxy, 2-tert-butyl-6-isopropylphenoxy, 2-tert-butyl-6-neopentylphenoxy, 2-isopropyl-6-neopentylphenoxy, and the like. 2,6-di-tert-butylphenoxy group is preferable as the alkoxy group among these examples.

Examples of the thiolate group represented by X in general formula (III) include: aliphatic thiolate group such as thiomethoxy, thioethoxy, thiopropoxy, n-thiobutoxy, thoisobutoxy, sec-thiobutoxy, tert-thiobutoxy, and the like; and arylthiolate group such as thiophenoxy, 2,6-di-tert-butylthiophenoxy, 2,6-diisopropylthiophenoxy, 2,6-dineopentylthiophenoxy, 2-tert-butyl-6-isopropylthiophenoxy, 2-tert-butyl-6-thioneopentylphenoxy, 2-isopropyl-6-thioneopentylphenoxy, triisopropylthiophenoxy, and the like. 2,4,6-triisopropylthiophenoxy group is preferable as the thiolate group among these examples.

Examples of the amino group represented by X in general formula (III) include: aliphatic amino group such as dimethylamino, diethylamino, diisopropylamino, and the like; arylamino group such as phenylamino, 2,6-di-tert-butylphenylamino, 2,6-diisopropylphenylamino, 2,6-dineopentylphenylamino, 2-tert-butyl-6-isopropylphenylamino, 2-tert-butyl-6-neopentylphenylamino, 2-isopropyl-6-neopentylphenylamino, 2,4,6-tri-cert-butylphenylamino, and the like; bis(trialkylsilyl)amino group such as bis(trimethylsilyl)amino; and the like. Bis(trimethylsilyl)amino group is preferable as the amino group among these examples.

Examples of the silyl group represented by X in general formula (III) include trimethylsilyl, tris(trimethylsilyl)silyl, bis(trimethylsilyl)methylsilyl, trimethylsilyl(dimethyl)silyl, (triisopropylsilyl)bis(trimethylsilyl)silyl, and the like. Tris(trimethylsilyl)silyl group is preferable as the silyl group among these examples.

Specific examples of the $C_{1-20}$ monovalent hydrocarbon group represented by X in general formula (III) include: normal/branched aliphatic hydrocarbon group such as methyl, ethyl, n-propyl, isopropyl, n-butyl, isobutyl, sec-butyl, tert-butyl, neopentyl, hexyl, octyl; aromatic hydrocarbon group such as phenyl, tolyl, naphthyl; aralkyl group such as benzyl; a hydrocarbon group containing silicon atom such as trimethylsilylmethyl, bis(trimethylsilyl)methyl; and the like. Methyl, ethyl, isobutyl, trimethylsilylmethyl, and the like are preferable as the $C_{1-20}$ monovalent hydrocarbon group among these examples.

Bistrimethylsilylamino group or a $C_{1-20}$ monovalent hydrocarbon group is preferable as X in general formula (III).

Examples of the non-coordinating anion represented by [B]⁻ in general formula (III) include quadrivalent boron anion. Specific examples of the quadrivalent boron anion include tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetratluoromethylphenyl)borate, tetra(tolyl)borate, tetra(xylyl)borate, triphenyl(pentafluorophenyl)borate, [tris(pentafluorophenyl)phenyl]borate, tridecahydride-7,8-dicarbaundecaborate, and the like. Tetrakis(pentafluorophenyl)borate is preferable as the quadrivalent boron anion among these examples.

The metallocene complexes respectively represented by general formulae (I) and (II) and the half metallocene cation complex represented by general formula (III) each further include 0 to 3, preferably 0 to 1, neutral Lewis base L. Examples of the neutral Lewis base L include tetrahydrofuran, diethyl ether, dimethylaniline, trimethylphosphine, lithium chloride, neutral olefin, neutral diolefin, and the like.

The neutral Lewis bases L, may be of either the same type or different types when the complex includes a plurality of neutral Lewis bases L.

The metallocene complexes respectively represented by general formulae (I) and (II) and the half metallocene cation complex represented by general formula (III) may each exist as any of monomer, dimer or another type of multimer.

The metallocene complex represented by general formula (I) can be obtained by, for example, causing lanthanoid trishalide, scandium trishalide or yttrium trishalide to react with an indenyl salt (such as potassium or lithium indenyl salt) and a bis(trialkylsilyl)amine salt (such as potassium or lithium salt of bis(trialkylsilyl)amine) in a solvent. The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene can be used. An example of a reaction for obtaining the metallocene complex represented by general formula (I) is shown below.

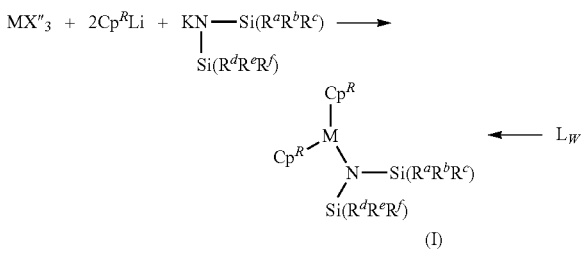

(In the reaction example above, X" represents a halide.)

The metallocene complex represented by general formula (II) can be obtained by, for example, causing lanthanoid trishalide, scandium trishalide or yttrium trishalide to react with an indenyl salt (such as potassium or lithium indenyl salt) and a silyl salt (such as potassium or lithium silyl salt) in a solvent. The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene can be used. An example of a reaction for obtaining the metallocene complex represented by general formula (II) is shown below.

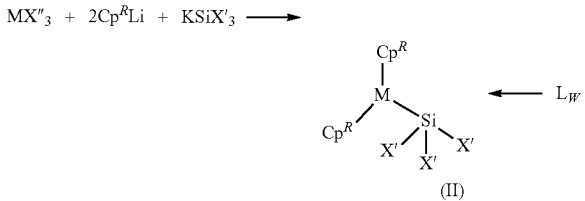

(In the reaction example above, X" represents a halide.)

The half metallocene cation complex represented by general formulae (III) can be obtained, for example, by a reaction shown below.

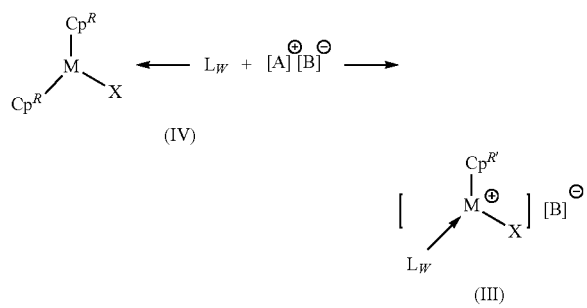

(IV)

(III)

In the compound represented by general formula (IV), M represents a lanthanoid element, scandium or yttrium; $Cp^R$'s each independently represent unsubstituted/substituted cyclopentadienyl, unsubstituted/substituted indenyl or unsubstituted/substituted fluorenyl; and X represents hydrogen atom, halogen atom, alkoxy, thiolate, amino, silyl, or a $C_{1-20}$ monovalent hydrocarbon group. L represents a neutral Lewis base and w represents an integer in the range of 0 to 3. $[A]^+$ represents a cation and $[B]^-$ represents a non-coordinating anion in an ionic compound represented by $[A]^+$ $[B]^-$.

Examples of the cation represented by $[A]^+$ include carbonium cation, oxonium cation, amine cation, phosphonium cation, cycloheptatrienyl cation, ferrocenium cation having transition metal, and the like. Examples of the carbonium cation include trisubstituted carbonium cation such as triphenylcarbonium cation, tri(substituted phenyl)carbonium cation, and the like. Specific examples of the tri(substituted phenyl)carbonium cation include tri(methylphenyl)carbonium cation. Examples of the amine cation include: trialkylammonium cation such as trimethylammonium cation, triethylammonium cation, tripropylammonium cation, tributylammonium cation; N,N-dialkylanilinium cation such as N,N-dimethylanilinium cation, N,N-diethylanilinium cation, N,N-2,4,6-pentamethylanilinium cation; dialkylammonium cation such as diisopropylamnionium cation, dicyclohexylammonium cation; and the like. Examples of phosphonium cation include triarylphosphonium cation such as triphenylphosphonium cation, tri(methylphenyl)phosphonium cation, tri(dimethylphenyl)phosphonium cation, and the like. N,N-dialkylanilinium cation or carbonium cation is preferable and N,N-dialkylanilinium cation is particularly preferable as $[A]^+$ among these examples.

The ionic compound represented by general formula $[A]^+$ $[B]^-$ for use in the aforementioned reaction is, for example, a compound obtained by combining a non-coordinating anion and a cation respectively selected from the aforementioned examples and preferably N,N-dimethylanilinium tetrakis(pentatluorophenyl)borate, triphenylcarbonium tetrakis(pentatluorophenyl)borate, and the like. The ionic compound represented by general formula $[A]^+$ $[B]^-$ is added to the metallocene complex by an amount preferably 0.1 to 10 times, more preferably approximately 1 times, as much as the amount of the metallocene complex when compared in mol. In the case where the half metallocene cation complex represented by general formula (III) is used for a polymerization reaction, the half metallocene cation complex represented by general formula (III) may be directly provided into a polymerization reaction system or, alternatively, the half metallocene cation complex represented by general formula (III) may be formed in a polymerization reaction system by providing a compound represented by general formula (IV) and the ionic compound represented by general formula $[A]^+$ $[B]^-$ for use in the aforementioned reaction, respectively, in the polymerization reaction system. Further alternatively, the half metallocene cation complex represented by general formula (III) may be formed in a polymerization reaction system by using the metallocene complex represented by general formula (I) or general formula (II) and the ionic compound represented by general formula $[A]^+$ $[B]^-$ in a combined manner in the polymerization reaction system.

Structures of the metallocene complex represented by general formula (I), the metallocene complex represented by general formula (II), and the half metallocene cation complex represented by general formula (III) are each preferably determined through x-ray structural analysis.

Other examples of the component (A-1) include a metallocene-based composite catalyst represented by the following formula (V):

(In formula (V), Rs each independently represent unsubstituted/substituted indenyl; M is coordinated with Rs; M represents a lanthanoid element, scandium or yttrium; Xs each independently represent a $C_{1-20}$ monovalent hydrocarbon group; M and Q are µ-coordinated with X; Q represents a group 13 element in the periodic table; Ys each independently represent a $C_{1-20}$ monovalent hydrocarbon group or a hydrogen atom; Q is coordinated with Y; and a=b=2).

Preferable examples of the metallocene-based composite catalyst represented by formula (V) include a metallocene-based composite catalyst represented by the following formula (VI):

(VI)

(In formula (VI), $M^1$ represents a lanthanoid element, scandium or yttrium; $Cp^R$s each independently represent unsubstituted/substituted indenyl; $R^A$ and $R^B$ each independently represent a $C_{1-20}$ hydrocarbon group; $M^1$ and Al are µ-coordinated with $R^A$ and $R^B$; and $R^C$ and $R^D$ each independently represent a $C_{1-20}$ hydrocarbon group or a hydrogen atom.)

A targeted multi-component copolymer can be efficiently manufactured by using the metallocene-based composite catalyst described above. Further, it is possible to reduce an amount of alkylaluminum for use in synthesis of the multi-component copolymer or even eliminate the alkylaluminum by using the metallocene-based composite catalyst described above, which, for example, has been combined with aluminum catalyst in advance to be a composite. It should be noted in this connection that a large amount of alkylaluminum is needed during the multi-component copolymer synthesis if the conventional catalyst system not using the aforementioned metallocene-based composite catalyst is employed. For example, alkylaluminum must be used by an amount at least 10 times as much as the chemically equivalent amount of a relevant metal catalyst in the conventional catalyst system not using the aforementioned metallocene-based composite catalyst. In contrast, in the case of using the metallocene-based composite catalyst described above, a superior catalytic effect is demonstrated by adding alkylaluminum by an amount around 5 times as much as the chemically equivalent amount of the relevant metal catalyst.

With regard to the metallocene-based composite catalyst described above, the metal M in general formula (V) is a lanthanoid element, scandium or yttrium. The lanthanoid elements include the fifteen elements Davina atomic numbers 57-71 and any of these elements is acceptable. Preferable examples of the metal M include samarium Sm, neodymium Nd, praseodymium Pr, gadolinium Gd, cerium Ce, holmium Ho, scandium Sc, and ythium Y.

In formula (V), Rs each independently represent unsubstituted/substituted indenyl and M is coordinated with Rs. Specific examples of the substituted indenyl group include 1,2,3-trimethyl indenyl, heptamethylindenyl, 1,2,4,5,6,7-hexamethylindenyl group, and the like.

In formula (V), Q represents a group 13 element in the periodic table and specific examples thereof include boron, aluminum, gallium, indium, thallium, and the like.

In formula (V), Xs each independently represent a $C_{1-20}$ monovalent hydrocarbon group and M and Q are μ-coordinated with X. Examples of the $C_{1-20}$ monovalent hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like. The expression that "M and Q are μ-coordinated with X" represents that M and Q are coordinated with X in a crosslinking manner.

In formula (V), Ys each independently represent a $C_{1-20}$ monovalent hydrocarbon group or a hydrogen atom and Q is coordinated with Y. In this connection, examples of the $C_{1-20}$ monovalent hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like.

In formula (VI), the metal $M^1$ is a lanthanoid element, scandium or yttrium. The lanthanoid elements include the fifteen elements having atomic numbers 57-71 and any of these elements is acceptable. Preferable examples of the metal $M^1$ include samarium Sm, neodymium Nd, praseodymium Pr, gadolinium Gd, cerium Co, holmium Ho, scandium Sc, and yttrium Y.

In formula (VI), $Cp^R$s are unsubstituted/substituted indenyls. $Cp^R$ having an indenyl ring as the base skeleton may be represented as $C_9H_{7-X}R_X$ or $C_9H_{11-X}R_X$, wherein X is an integer in the range of 0 to 7 or 0 to 11; Rs preferably each independently represent hydrocarbyl or metalloid group; and the number of carbon atoms of the hydrocarbyl group is preferably in the range of 1 to 20, more preferably in the range of 1 to 10, and still more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like.

Specific examples of the substituted indenyl include 2-phenylindenyl, 2-methylindenyl, and the like. The two $Cp^R$s in general formula (VI) may be of either the same type or different types.

In formula (VI), $R^A$ and $R^B$ each independently represent a $C_{1-20}$ monovalent hydrocarbon group and $M^1$ and Al are μ-coordinated with $R^A$ and $R^B$. In this connection, examples of the $C_{1-20}$ monovalent hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like. The expression that "$M^1$ and Al are μ-coordinated with $R^A$ and $R^B$" represents that $M^1$ and Al are coordinated with $R^A$ and $R^B$ in a crosslinking manner.

In formula (VI), $R^C$ and $R^D$ each independently represent a $C_{1-20}$ monovalent hydrocarbon group or a hydrogen atom. In this connection, examples of the $C_{1-20}$ monovalent hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like.

The metallocene-based composite catalyst described above can be obtained by, for example, causing a metallocene complex represented by the following formula (VII) to react with an organic aluminum compound represented by $AlR^KR^LR^M$ in a solvent.

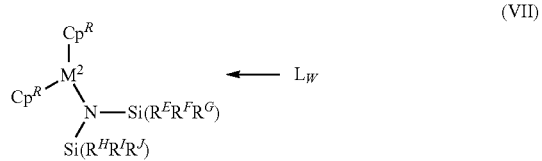

(VII)

(In formula (VII), $M^2$ represents a lanthanoid element, scandium or yttrium; $Cp^R$s each independently represent unsubstituted/substituted indenyl; $R^E$ to $R^J$ each independently represent a $C_{1-3}$ alkyl group or a hydrogen atom; L represents a neutral Lewis base; and w represents an integer in the range of 0 to 3).

The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene or hexane can be used. The structure of the metallocene-based composite catalyst described above is preferably determined through x-ray structural analysis.

In the metallocene complex represented by general formula (VII), $Cp^R$s each independently represent unsubstituted/substituted indenyl and are defined in the same manner as $Cp^R$s in general formula (VI); and the metal $M^2$ is a lanthanoid element, scandium or yttrium and defined in the same manner as the metal $M^1$ in formula (VI).

The metallocene complex represented by formula (VII) includes a silylamide ligand [—N(SiR$_3$)$_2$]. R groups included in the silylamide ligand (i.e., $R^E$ to $R^J$ in general formula (VII)) each independently represent a $C_{1-3}$ alkyl group or a hydrogen atom. It is preferable that at least one of $R^E$ to $R^J$ is a hydrogen atom. The catalyst can be easily synthesized when at least one of $R^E$ to $R^J$ is a hydrogen atom. Methyl group is preferable as the alkyl group.

The metallocene complex represented by formula (VII) further includes 0 to 3, preferably 0 to 1, neutral Lewis base L. Examples of the neutral Lewis base L include tetrahydrofuran, diethyl ether, dimethylaniline, trimethylphosphine, lithium chloride, neutral olefin, neutral diolefin, and the like. The neutral Lewis bases L may be of either the same type or different types when the complex includes a plurality of neutral Lewis bases L.

The metallocene complex represented by general formula (VII) may exist as any of monomer, dimer or another type of multimer.

The organic aluminum compound for use in generation of the metallocene-based composite catalyst described above is represented by $AlR^KR^LR^M$, wherein $R^K$ and $R^L$ each independently represent a $C_{1-20}$ monovalent hydrocarbon group or a hydrogen atom; $R^M$ represents a $C_{1-20}$ monovalent hydrocarbon group; and $R^M$ may be of either the same type as or a different type from $R^K$ or $R^L$. Examples of the $C_{1-20}$ monovalent hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like.

Specific examples of the organic aluminum compound include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride; ethylaluminum dihydride, n-propylaluminum dihydride, isobutylaluminum dihydride, and the like. Triethylaluminum, triisobutylaluminum, diethylaluminum hydride and diisobutylaluminum hydride are preferable as the organic aluminum compound among these examples. Either a single type or combination of two or more types of these examples may be used as the organic aluminum compound. An amount of the organic aluminum compound for use in generation of the metallocene-based composite catalyst is preferably 1 to 50 times, more preferably approximately 10 times, as much as the amount of the metallocene complex when compared in mol.

The component (A-2)

The component (A-2) is a rare earth element compound or a reactant resulted from a reaction between the rare earth element compound and a Lewis base, wherein each of the rare earth element compound and the reactant thereof has no bond between the relevant rare earth element and a carbon atom. A rare earth element compound or a reactant resulted from a reaction between the rare earth element compound and a Lewis base, having no bond between the relevant rare earth metal and a carbon atom, is stable as a compound and easy to handle. In the present disclosure, a "rare earth element compound" represents a compound containing a rare earth element (M), i.e., one of lanthanoid elements constituted of atomic number 57-71 elements in the periodic table, or scandium or yttrium.

Specific examples of the lanthanoid elements include lanthanum, cerium, praseodymium, neodymium, promethium, samarium, europium, gadolinium, terbium, dysprosium, holmium, erbium, thulium, ytterbium, and lutetium. Either a single type or combination of two or more types of the examples may be used as the of the component (A-2).

The rare earth element compound described above is preferably a salt or a complex compound containing a divalent/trivalent rare earth metal and more preferably a rare earth element compound having at least one type of ligand selected from hydrogen atom, halogen atom, and an organic compound residue. Further, the rare earth element compound or the reactant resulted from a reaction between the rare earth element compound and a Lewis base is preferably represented by following general formula (VIII) or general formula (IX):

(VIII)

(IX)

(In these formulae, $M^{11}$ represents a lanthanoid element, scandium or yttrium, $X^{11}$s each independently represent hydrogen atom, halogen atom, alkoxy group, thiolate group, amino group, silyl group, aldehyde residue, ketone residue, carboxylic acid residue, thiocarboxylic acid residue or phosphorus compound residue, $L^{11}$ represents a Lewis base, and w represents an integer in the range of 0 to 3.)

Examples of the group (ligand) bonded to a rare earth element of the rare earth element compound include hydrogen atom, halogen atom, alkoxy group (a group obtained by removing hydrogen from the hydroxy group of alcohol and capable of forming a metal alkoxide), thiolate group (a group obtained by removing hydrogen from the thiol group of a thiol compound and capable of forming a metal thiolate), amino group (a group obtained by removing one hydrogen atom bonded to nitrogen atom of ammonia, primary amine or secondary amine and capable of forming a metal amide), silyl group, a residue of aldehyde, a residue of ketone, a residue of carboxylic acid, a residue of thiocarboxylic acid, and a residue of a phosphorus compound.

Specific examples of the group (ligand) bonded to a rare earth element of the rare earth element compound include: hydrogen atom; aliphatic alkoxy group such as methoxy, ethoxy, propoxy, n-butox, isobutoxy, sec-butoxy, tort-butoxy, and the like; phenoxy, 2,6-di-tert-butylphenoxy, 2,6-diisopropylphenoxy, 2,6-dineopentylphenoxy, 2-tert-butyl-6-isopropylphenoxy, 2-tert-butyl-6-neopentylphenoxy, 2-isopropyl-6-neopentylphenoxy; aliphatic thiolate group such as thiomethoxy, thioethoxy, thiopropoxy, n-thiobutoxy, thioisobutoxy, sec-thiobutoxy, tert-thiobutoxy, and the like; aryl thiolate group such as thiophenoxy, 2,6-di-tert-butyl-thiophenoxy, 2,6-diisopropylthiophenoxy, 2,6-dineopentyl-thiophenoxy, 2-tert-butyl-6-isopropylthiophenoxy, 2-tert-butyl-6-thioneopentylphenoxy, 2-isopropyl-6-thioneopentylphenoxy, 2,4,6-triisopropylthiophenoxy, and the like; aliphatic amino group such as dimethylamino, diethylamino, diisopropylamino, and the like; acylamino group such as phenylamino, 2,6-di-tert-butylphenylamino, 2,6-diisopropylphenylamino, 2,6-dineopentylphenylamino, 2-tert-butyl-6-isopropylphenylamino, 2-tert-buty-6-neopentylphenylamino, 2-isopropyl-6-neopentylphenylamino, 2,4,6-tri-tert-butylphenylamino, and the like; bistrialkylsilylamino group such as bistrimethylsilylamino; silyl group such as trimethylsilyl, tris(trimethylsilyl)silyl, bis(trimethylsilyl)methylsilyl, trimethylsilyl(dimethyl)silyl, triisopropylsilyl(bistrimethylsilyl)silyl, and the like; a halogen atom such as fluorine, chlorine, bromine, iodine atoms; and the like.

Specific examples of the ligand further include: a residue of aldehyde such as salicylaldehyde, 2-hydroxy-1-naphthaldehyde, 2-hydroxy-3-naphthaldehyde, and the like; a residue of hydroxyphenone such as 2'-hydroxyacetophenone, 2'-hydroxybutylophenone, 2'-hydroxypropiophenone, and the like; a residue of ketone (a residue of diketone in particular) such as acetylacetone, benzoylacetone, propionylacetone, isobutylacetone, valeryl acetone, ethylacetylacetone, and the like; a residue of carboxylic acid such as isovaleric acid, caprylic acid, octanoic acid, lauric acid, myristic acid, palmitic acid, stearic acid, isostearic acid, oleic acid, linoleic acid, cyclopentanecarboxylic acid, naphthenic acid, ethylhexanoic acid, pivalic and, versatic acid (a product manufactured by Shell Chemicals, which is a synthetic acid composed of a mixture of isomers of $C_{10}$ monocarboxylic acid), phenylacetic acid, benzoic acid, 2-naphthoic acid, maleic acid, succinic acid, and the like; a residue of thocarboxylic acid such as hexanethioic acid, 2,2-dimethylbutanethioic acid, decanethioic acid, thioberoic acid, and the like; a residue of phosphate ester such as dibutyl phosphate, dipentyl phosphate, dihexyl phosphate, diheptyl phosphate, dioctyl phosphate, bis(2-ethylhexyl) phosphate, bis(1-methylheptyl) phosphate, dilauryl phosphate, dioleoyl phosphate, diphenyl phosphate, bis(p-nonylphenyl) phosphate, bis (polyethylene glycol-p-nonylphenyl) phosphate, (butyl)(2-ethylhexyl) phosphate, (1-methylheptyl)(2-ethylhexyl) phosphate, (2-ethylhexyl)(p-nonylphenyl) phosphate, and the like; a residue of phosphonic acid ester such as monobutyl (2-ethylhexyl)phosphonate, mono-2-ethylhexyl (2-ethylhexyl)phosphonate, mono-2-ethylhexyl phenylphosphonate, mono-p-nopylphenyl (2-ethylhexyl)phosphonate, mono-2-ethylhexyl phosphonate, mono-1-methyheptyl phosphonate, mono-p-nonylphenyl phosphonate, and the like; a residue of phosphinic acid such as dibutyl phophinic acid, bis(2-ethylhexyl)phosphinic acid, bis(1-methylheptyl)phosphinic acid, dilauryl phosphinic acid, dioleoyl phosphinic acid, diphenyl phosphinic acid, bis(p-nonylphenyl)phosphinic acid, butyl(2-ethylhexyl) phosphinic acid, (2-ethylhexyl)(1-methylheptyl)phosphinic acid, (2-ethylhexyl)(p-nonylphenyl)phosphinic acid, butyl phosphinic acid, 2-ethylhexyl phosphinic acid, 1-methylheptyl phosphinic acid, oleoyl phosphinic acid, lauryl phosphinic acid, phenyl phosphinic acid, p-nonylphenyl phosphinic acid, and the like. Either a single type or combination of two or more types of the aforementioned examples may be used as the ligands.

Examples of the Lewis base which reacts with the rare earth element compound include tetrahydrofuran, diethyl ether, dimethylaniline, trimethylphosphine, lithium chloride, neutral olefins, neutral diolefins, and the like. In this connection, in a case where the rare earth element compound is caused to react with a plurality of Lewis bases (i.e., in a case where w=2 or 3 in formula (VIII) and formula (IX)), these Lewis bases $L^{11}$s may be of either the same type or the different types.

The rare earth element compound is preferably a compound represented by general formula (X) below.

$$M\text{-}(AQ^1)(AQ^2)(AQ^3) \tag{X}$$

(In general formula (X), M is selected from scandium, yttrium and lanthanoid elements; $AQ^1$, $AQ^2$ and $AQ^3$ represent functional groups which may be of either the same type or different types, respectively; "A" represents an element selected from nitrogen, oxygen and sulfur; and the compound essentially includes at least one M-A bond).

Specific examples of the lanthanoid elements include lanthanum, cerium, praseodymium, neodymium, promethium, samarium, europium, gadolinium, terbium, dysprosium, holmium, erbium, thulium, ytterbium, and lutetium. The aforementioned compound is a component capable of improving catalytic activity in the reaction system, reducing reaction time and increasing the reaction temperature.

Gadolinium is preferable as "M" in general formula (X) in terms of enhancing the catalytic activity and the reaction controllability.

When "A" in general formula (X) represents nitrogen, examples of the functional group represented by $AQ^1$, $AQ^2$ and $AQ^3$ (i.e., $NQ^1$, $NQ^2$ and $NQ^3$) include amino group and the like. The rare earth element compound has three M-N bonds in this case.

Examples of the amino group include: aliphatic amino group such as dimethylamino, diethylamino, diisopropylamino; arylamino group such as phenylamino, 2,6-di-tert-butylphenylamino, 2,6-diisopropylphenylamino, 2,6-dineopentylphenylamino, 2-tert-butyl-6-isopropylphenylamino, 2-tert-butyl-6-neopentylphenylamino, 2-isopropyl-6-neopentylphenylamino, 2,4,6-tri-tert-butylphenylamino, and the like; and bistrialkylsilylamino group such as bistrimethylsilylamino. Bistrimethylsilylamino group is preferable as the amino group among these examples in terms of solubility to aliphatic hydrocarbon and aromatic hydrocarbon. Either a single type or combination of two or more types of these examples may be used as the amino group.

According to the structural features described above, the component (A-2) can be a compound having three M-N bonds chemically equivalent to each other, whereby the component (A-2) has a stable structure and is easy to handle.

Further, according to the structural features described above, it is possible to further improve catalytic activity in the reaction system, thereby further reducing reaction time and further increasing the reaction temperature.

When "A" in general formula (X) is oxygen, type of the rare earth element-containing compound represented by general formula (X), i.e., $M\text{-}(OQ^1)(OQ^2)(OQ^3)$, is not particularly restricted. Examples of the rare earth element-containing compound in this case include:

a rear earth alcoholate represented by general formula (XI) shown below; and $$(RO)_3M \tag{XI}$$

a rear earth carboxylate represented by general formula (XII) shown below.

$$(R\text{---}CO_2)_3M \tag{XII}$$

In general formula (XI) and general formula (XII), "R"s represent $C_{1\text{-}10}$ alkyl groups, respectively, which may be of either the same type or different types.

When "A" in general formula (X) is sulfur, type of the rare earth element-containing compound represented by general formula (X), i.e., $M\text{-}(SQ^1)(SQ^2)(SQ^3)$, is not particularly restricted. Examples of the rare earth element-containing compound in this case include:

a rear earth alkylthiolate represented by general formula (XIII) shown below; and $$(RS)_3M \tag{XIII}$$

a compound represented by general formula (XIV) shown below.

$$(R\text{---}CS_2)_3M \tag{XIV}$$

In general formula (XIII) and general formula (XIV), "R"s represent $C_{1\text{-}10}$ alkyl groups, respectively, which may be of either the same type or different types.

The organic metal compound (the component (B)) described above is represented by the following general formula (XV):

$$YR^1_a R^2_b R^3_c \tag{XV}$$

(In general formula (XV), Y represents a metal selected from the group 1, 2, 12 and 13 elements in the periodic table, $R^1$ and $R^2$ each represent a $C_{1\text{-}10}$ hydrocarbon group or a hydrogen atom, $R^3$ represents a $C_{1\text{-}10}$ hydrocarbon group, $R^1$, $R^2$ and $R^3$ may be of either the same type or different types, a=1 and b=c=0 when Y is a metal selected from the group 1 elements in the periodic table, a=b=1 and c=0 when Y is a metal selected from the groups 2, 12 elements in the periodic table, and a=b=c=1 when Y is a metal selected from the group 13 elements in the periodic table.).

In general formula (XV), specific examples of the $C_{1\text{-}10}$ hydrocarbon group(s) represented by $R^1$, $R^2$ and $R^3$ include: a normal/branched aliphatic hydrocarbon group such as methyl, ethyl, n-propyl, isopropyl, n-butyl, isobutyl, sec-butyl, tert-butyl, neopentyl, hexyl, octyl group, and the like; an aromatic hydrocarbon group such as phenyl, tolyl, naphthyl group, and the like; an aralkyl group such as benzyl group; and the like. Methyl, ethyl, isobutyl groups and the like are preferable among these examples.

The component (B) is preferably an organic aluminum compound represented by general formula (XVI):

$$AlR^1R^2R^3 \quad (XVI)$$

(In general formula (XVI), $R^1$ and $R^2$ each represent a $C_{1-10}$ hydrocarbon group or a hydrogen atom and $R^3$ represents a $C_{1-10}$ hydrocarbon group, wherein $R^1$, $R^2$ and $R^3$ may be of either the same type or different types.)

The organic aluminum compound corresponds to a compound represented by general formula (XV) in which Y is Al and a=b=c=1.

Examples of the organic aluminum compound represented by general formula (XVI) include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride; ethylaluminum dihydride, n-propylaluminum dihydride, isobutylaluminum dihydride, and the like. Triethylaluminum, triisobutylaluminum, diethylaluminum hydride, and diisobutylaluminum hydride are preferable as the organic aluminum compound among these examples.

Either a single type or combination of two or more types of the aforementioned examples may be used as the component (B). A content of the component (B) is preferably 1 to 50 times and more preferably approximately 10 times as much as the content of the component (A) when compared in mol when the component (B) is used with the component (A).

The aluminoxane (the component (C)) described above is a compound obtained by bringing an organic aluminum compound into contact with a condensing agent. It is possible by using the component (C) to i) further improve catalytic activity in the polymerization reaction system, so that the target copolymer can be easily obtained and ii) further reduce reaction time and increase the reaction temperature.

Examples of the organic aluminum compound described above include trialkylaluminum such as trimethylaluminum, triethylaluminum, triisobutylaluminum, and a mixture thereof. Trimethylaluminum and a mixture of trimethylaluminum and tributylaluminum are preferable among these examples as the organic aluminum compound.

Examples of the condensing agent include water and the like.

Examples of the component (C) include aluminoxane represented by following general formula (XVII):

$$-(Al(R^7)O)_n- \quad (XVII)$$

(In general formula (XVII), $R^7$ represents a $C_{1-10}$ hydrocarbon group; some of the hydrocarbon groups may be substituted with halogen atom and/or alkoxy group; respective $R^7$s may be of either the same type or different types among the repeating units; and n is preferably $\geq 5$).

The molecular structure of the aluminoxane described above may be either linear or cyclic.

It is preferable that "n" in general formula (XVII) is $\geq 10$.

Further, examples of the hydrocarbon group as $R^7$ in general formula (XVII) include methyl, ethyl, propyl, isobutyl group, and the like. Methyl group is particularly preferable among these examples. Either a single type or combination of two or more types of these examples may be used as the hydrocarbon group. Methyl group and isobutyl group in combination are preferably used as the hydrocarbon group or $R^7$ in general formula (XVII) in this regard.

It is preferable that the aforementioned aluminoxane has high solubility to an aliphatic hydrocarbon and low solubility to an aromatic hydrocarbon. Preferable examples of the aluminoxane include commercially available aluminoxane sold in the form of a hexane solution.

Examples of the aliphatic hydrocarbon include hexane, cyclohexane, and the like.

Acceptable examples of the component (C) include, in particular, a modified aluminoxane represented by general formula (XVIII) shown below (which particular modified aluminoxane will occasionally be referred to as "TMAO" hereinafter).

$$-(Al(CH_3)_x(i-C_4H_9)_yO)_m- \quad (XVIII)$$

(In general formula (XVIII), x+y=1; "m" is $\geq 5$.)

Examples of TMAO include that having a product name "TMAO-341" manufactured by Tosoh Finechem Corporation.

Specifically, the component (C) may be a modified aluminoxane represented by general formula (XIX) shown below (which specific modified aluminoxane will occasionally be referred to as "MMAO" hereinafter).

$$-(Al(CH_3)_{0.7}(i-C_4H_9)_{0.3}O)_k- \quad (XIX)$$

(In general formula (XIX), "k" is $\geq 5$.)

Examples of MMAO include that having a product name "MMAO-3A" manufactured by Tosoh Finechem Corporation.

Alternatively, the component (C) may be, in particular, a modified aluminoxane represented by general formula (XX) (which particular modified aluminoxane will occasionally be referred to as "PMAO" hereinafter).

$$-[(CH_3)AlO]_i- \quad (XX)$$

(In general formula (XX), "i" is $\geq 5$.)

Examples of PMAO include that having a product name "PMAO-211" manufactured by Tosoh Finechem Corporation.

The component (C) is preferably MMAO or TMAO in terms of improving a catalytic activity-enhancing effect and more preferably TMAO, in particular, in terms of further improving the catalytic activity-enhancing effect among MMAO, TMAO and PMAO described above.

Either a single type or combination of two or more types of the aforementioned examples may be used as the component (C).

When the component (C) is used with the component (A), the component (C) is used such that an aluminum content in the component (C) is preferably $\geq 10$ mol, more preferably $\geq 100$ mol, and preferably $\leq 1000$ mol, more preferably $\geq 800$ mol, per 1 mol of a rare earth element in the component (A) in terms of improving catalytic activity.

The ionic compound (the component (D)) is constituted of a non-coordinating anion and a cation. When the component (D) is used with the component (A), examples of the component (D) include an ionic compound or the like capable of reacting with the component (A) and generating a cationic transition metal compound.

Examples of the non-coordinating anion include quadrivalent boron anion such as tetraphenyl borate, tetrakis(monofluorophenyl)borate, tetrakis(difluorophenyl)borate, tetrakis(trifluorophenyl)borate, tetrakis(tetrafluorophenyl) borate, tetrakis(pentafluorophenyl)borate, tetrakis(tetrafluoromethylphenyl)borate, tetra(tolyl)borate, tetra(xylyl)borate, triphenyl(pentafluorophenyl)borate, [tris (pentafluorophenyl)phenyl]borate, tridecahydride-7,8-dicarbaundecaborate, and the like. Tetrakis (pentafluorophenyl)borate is preferable as the quadrivalent boron anion among these examples.

Examples of the cation include carbonium cation, oxonium cation, amine cation, phosphonium cation, cycloheptatrienyl cation, ferrocenium cation having transition metal, and the like. Specific examples of the carbonium cation include trisubstituted carbonium cation such as triphenylcarbonium cation (which is also referred to as "trityl cation"), tri(substituted phenyl)carbonium cation, and the like. Specific examples of the tri(substituted phenyl)carbonium cation include tri(methylphenyl)carbonium cation, tri(dimethylphenyl)carbonium cation, and the like. Examples of the amine cation include ammonium cation, and the like. Specific examples of ammonium cation include: trialkylammonium cation such as trimethylammonium cation, triethylammonium cation, tripropylammonium cation, tributylammonium cation (e.g., tri(n-butyl)ammonium cation); N,N-dialkylanilinium cation such as N,N-dimethylanilinium cation, N,N-diethylanilinium cation, N,N-2,4,6-pentamethylanilinium cation; dialkylammonium cation such as diisopropylammonium cation, dicyclohexylammonium cation; and the like. Specific examples of phosphonium cation include triarylphosphonium cation such as triphenylphosphonium cation, tri(methylphenyl)phosphonium cation, tri(dimethylphenyl)phosphonium cation, and the like. N,N-dialkylanilinium cation or carbonium cation is preferable and N,N-dialkylanilinium cation is particularly preferable among these examples of the cation.

Accordingly, a compound as a combination of a non-coordinating anion and a cation respectively selected from the aforementioned examples is preferably used as the ionic compound (the component (D)). Specifically, N,N-dimethylanilinium tetrakis(pentafluorophenyl)borate, triphenylcarbonium tetrakis(pentafluorophenyl)borate, and the like are preferable as the component (D).

Either a single type or combination of two or more types of the aforementioned examples may be used as the component (D). When the component (D) is used with the component (A) described above, the component (D) is used such that a content thereof is preferably 0.1 to 10 times, more preferably approximately 1 times, as much as the content of the component (A) when compared in mol.

Examples of the halogen compound (the component (E)) described above include: a halogen-containing compound as a Lewis acid (which will occasionally be referred to as "component (E-1)" hereinafter); a complex compound of a metal halide and a Lewis base (which will occasionally be referred to as "component (E-2)" hereinafter); an organic compound containing an active halogen (which will occasionally be referred to as "component (E-3)" hereinafter); and the like. When the component (E) is used with, for example, the component (A) described above, the component (E) is capable of reacting with the compound (A), to generate a cationic transition metal compound, a halide transition metal compound, or a compound of which transition metal center is deficient in charge.

Examples of the component (E-1) include a halogen compound containing a group 3, 4, 5, 6, 8, 13, 14 or 15 element in the periodic table. Preferable examples of the component (E-1) include an aluminum halide and an organic metal halide. Chlorine or bromine is preferable as the halogen element.

Specific examples of the halogen-containing compound as a Lewis acid include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, tris(pentafluorophenyl)aluminum, tris (pentafluorophenyl)borate, antimony trichloride, antimony pentachloride, phosphorus trichloride, phosphorus pentachloride, tin tetrachloride, titanium tetrachloride, tungsten hexachloride, and the like. Diethylaluminum chloride, ethylaluminum sesquichloride, ethylaluminum dichloride, diethylaluminum bromide, ethylaluminum sesquibromide, and ethylaluminum dibromide are particularly preferable among these examples as the halogen-containing compound as a Lewis acid.

Either a single type or combination of two or more types of these examples may be used as the component (E-1).

Examples of the metal halide constituting the component (E-2) described above include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, gold bromide, and the like. Magnesium chloride, calcium Chloride, barium chloride, manganese chloride, zinc chloride and copper chloride are preferable as the metal halide among these examples. Magnesium chloride, manganese chloride, zinc chloride and copper chloride are particularly preferable.

Further, preferable examples of the Lewis base constituting the component (E-2) include a phosphorus compound, a carbonyl compound, a nitrogen compound, an ether compound, alcohol, and the like. Specifically, acceptable examples of the Lewis base include tributyl phosphate, tris (2-ethylhexyl) phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethyl-hexanoic acid, oleic acid, stearic acid, benzoic acid, naphthenic acid, versatic acid, triethylamine, N,N-dimethylacetoamide, tetrahydrofuran, diphenyl ether, 2-ethyl-hexyl alcohol oleyl alcohol, stearyl alcohol, phenol, benzyl alcohol, 1-decanol, laurel alcohol, and the like. Tris (2-ethylhexyl) phosphate, tricresyl phosphate, acetylacetone, 2-ethyl-hexanoic acid, versatic acid, 2-ethylhexyl alcohol, 1-decanol, and lauryl alcohol are preferable as the Lewis base among these examples.

0.01 to 30 mol (preferably 0.5 to 10 mol) per 1 mol of the metal halide, of the aforementioned Lewis base, is caused to react with the metal halide. Metals remaining in the copolymer can be reduced by using a reactant thus obtained by the reaction between the metal halide and the Lewis base.

Either a single type or combination of two or more types of the aforementioned examples may be used as the component (E-2).

Examples of the component (E-3) described above include benzyl chloride and the like.

Either a single type or a mixture of two or more types of the examples described above may be used as the halogen component (E).

When the component (E) is used with the component (A) described above, the component (E) is used such that a content thereof is preferably 0 to 5 times, more preferably approximately 1 to 5 times, as much as the content of the component (A) when compared in mol.

The cyclopentadiene skeleton-containing compound (the component (F)) has a group selected from a cyclopentadienyl group, an indenyl group and a fluorenyl group. Specifically, the cyclopentadiene skeleton-containing compound (F) is at least one compound selected from the group consisting of a substituted/unsubstituted cyclopentadiene, a substituted/unsubstituted indene, and a substituted/unsubstituted fluorene. Either a single type or combination of two or more types of the aforementioned examples may be used as the component (F).

Examples of the substituted/unsubstituted cyclopentadiene include cyclopentadiene, pentamethylcyclopentadiene, tetramethylcyclopentadiene, isoproplylcyclopentadiene, trimethylsilyl-tetramethylcyclopentadiene, (1-benzyldimethylsilyl)cyclopenta[I]phenanthrene, and the like.

Examples of the substituted/unsubstituted indene include indene, 2-phenyl-1H-indene, 3-benzyl-1H-indene, 3-methyl-2-phenyl-1H-indene, 3-benzyl-2-phenyl-1H-indene, 1-benzyl-1H-indene, 1-methyl-3-dimethylbenzylsilyl-indene, 1,3-bis(t-butyldimethylsilyl) indene, (1-benzyldimethylsilyl-3-cyclopentyl)indene, (1-benzyl-3-t-butyldiemthylsilyl) indene, and the like. 3-benzyl-1H-indene and 1-benzyl-1H-indene are preferable in particular in terms of making the molecular weight distribution narrow.

Examples of the substituted/unsubstituted fluorene include fluorene, trimethylsilylfluorene, isopropylfluorene, and the like.

The cyclopentadiene skeleton-containing compound (the component (F)) is preferably a substituted cyclopentadiene, a substituted indene or a substituted fluorene, and more preferably a substituted indene, in particular. In such preferable cases, the polymerization catalyst is bulky enough in terms of advantageously increasing a steric hindrance effect thereof, thereby successfully shortening reaction time and raising the reaction temperature. Further, in such preferable cases, the polymerization catalyst has a large number of electrons in a conjugated system, thereby successfully further improving the catalytic activities in the reaction system.

Examples of a substituent group of the substituted cyclopentadiene, the substituted indene, and the substituted fluorene include a hydrocarbyl or a metalloid group. The number of carbon atoms of the hydrocarbyl group is preferably in the range of 1 to 20, more preferably in the range of 1 to 10, and still more preferably in the range of 1 to 8. Specifically, preferable examples of the hydrocarbyl group include methyl, ethyl, phenyl, benzyl groups and the like. On the other hand, examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl group, and the like.

Either a single type or combination of two or more types of the aforementioned examples may be used as the component (F). When the component (F) is used with the component (A) described above, the component (F) is used such that a content thereof is preferably>0 times, more preferably≥0.5 times, still more preferably≥≥1 times, and preferably≤3 times, more preferably≤2.5 times, still more preferably≤2.2 times, as much as the content of the component (A) when compared in mol in terms of improving the catalytic activity.

The components (A)-(F) described above may be combined with each other in various manners to form catalyst compositions and it is preferable to employ a catalyst composition thus obtained in the aforementioned polymerization process. Preferable examples of the catalyst composition include a first catalyst composition and a second catalyst composition described below.

The first catalyst composition contains the component (A-1), the component (B), and the component (D) described above. It is preferable that the first catalyst composition further contains at least one of the component (C) and the component (E) as an optional component. In this regard, inclusion of the component (B) is also optional in a case where the component (A-1) is a metallocene-based composite catalyst represented by general formula (V).

The second catalyst composition contains the component (A-2), the component (B), and the component (D) described above. It is preferable that the second catalyst composition further contains at least one of the component (C), the component (E) and the component (F) as an optional component. A catalytic activity improves when the second catalyst composition contains the component (F).

The coupling process is a process of carrying out a reaction (a coupling reaction) for modifying at least a portion, e.g., a terminal end, of a polymer chain of the multi-component copolymer obtained by the polymerization process described above. The coupling reaction is preferably carried out in the coupling process when a conversion ratio in the polymerization reaction has reached 100%.

Type of a coupling agent for use in the coupling reaction is not particularly restricted and can be appropriately selected according to the purpose. Examples of the coupling agent include: (i) a tin-containing compound such as bis(maleic acid-1-octadecyl)dioctyl tin (IV); (ii) an isocyanate compound such as 4,4'-diphenylmethane diisocyanate; (iii) an alkoxysilane compound such as glycidyl propyltrimethoxysilane, and the like. Either a single type or combination of two or more types of these examples may be used as the coupling agent. Bis(maleileic acid-1-octadecyl)dioctyl tin (IV) is preferable as the coupling agent among these examples in terms of high reaction efficiency and relatively little gel generation.

It is possible to increase the number average molecular weight (Mn) of a resulting multi-component copolymer by carrying out a coupling reaction.

Rinsing process is a process of rinsing a multi-component copolymer obtained by the aforementioned polymerization process. Type of a solvent for use in the rinsing process is not particularly restricted and can be appropriately selected according to the purpose. Examples of the solvent include methanol, ethanol, isopropanol, and the like. An acid (such as hydrochloric acid, sulfuric acid, nitric acid) may be added, for use, to such a solvent as described above in the rinsing process when a Lewis acid-derived catalyst is used as the polymerization catalyst, in particular. An amount to be added, of the acid, is preferably 15 mol % or less with respect to the solvent. Addition of the acid by an amount exceeding 15 mol % with respect to the solvent may cause the acid to remain in the multi-component copolymer, possibly adversely affecting a mixing and kneading process and a vulcanization reaction.

An amount of catalyst residue in the multi-component copolymer can be reduced to an appropriate level by the rinsing process.

Rubber Composition

A rubber composition of the present disclosure characteristically includes the aforementioned multi-component copolymer. The rubber composition of the present disclosure, exhibiting reduced heat generation in a low strain region, can decrease rolling resistance of a tire when it is applied to the tire.

The rubber composition of the present disclosure includes the aforementioned multi-component copolymer as a rubber component and optionally may further include other rubber components, a filler, a crosslinking agent and other components.

A content of the multi-component copolymer in the rubber component of the rubber composition of the present disclosure is preferably in the range of 10 to 100 mass %, more preferably in the range of 20 to 100 mass %, and still more preferably in the range of 30 to 100 mass %. When a content of the multi-component copolymer in the rubber component of the rubber composition is ≥10 mass %, the anticipated effect by the multi-component copolymer will be fully demonstrated, whereby the rubber composition exhibits satisfactorily reduced heat generation in a low strain thereof and rolling resistance of a tire can be decreased when the rubber composition is applied to the tire.

Types of rubber components other than the multi-component copolymer of the present disclosure are not particularly restricted and can be appropriately selected according to the purpose. Examples of other rubber components include natural rubber (NR), polyisoprene rubber (IR), polybutadiene rubber (BR), acrylonitrile-butadiene rubber (NBR), chloroprene rubber, ethylene-propylene rubber (EPM), ethylene-propylene-nonconjugated diene rubber (EPDM), polysulfide rubber, silicone rubber, flurorubber, urethane rubber, and the like. Either a single type or combination of two or more types of these examples may be used as the other rubber components.

The rubber composition can improve reinforcing properties thereof by including a filler therein. Type of the filler is not particularly restricted and examples thereof include carbon black, silica, aluminum hydroxide, clay, alumina, talc, mica, kaolin, glass balloons, glass beads, calcium carbonate, magnesium carbonate, magnesium hydroxide, magnesium oxide, titanium oxide, potassium titanate, barium sulfate, and the like. Carbon black is preferably used among these examples. Either a single type or combination of two or more types of these examples may be used as the filler.

A content of the tiller, although it is not particularly restricted and appropriately selected according to the purpose, is preferably 10 to 100 parts by mass, more preferably 20 to 80 parts by mass, and most preferably 30 to 60 parts by mass, with respect to 100 parts by mass of the rubber component. The content of filler, of ≥10 parts by mass with respect to 100 parts by mass of the rubber component, ensures an effect of improving the reinforcing property of the rubber composition by the filler. The content of filler, of ≤100 parts by mass with respect to 100 parts by mass of the rubber component, ensures good workability of the rubber composition.

Type of the crosslinking agent is not particularly restricted and can be appropriately selected according to the purpose. Examples of the crosslinking agent include sulfur-based crosslinking agent, organic peroxide-based crosslinking agent, inorganic crosslinking agent, polyamine crosslinking agent, resin crosslinking agent, sulfur compound-based crosslinking agent, oxime-nitrosamine-based crosslinking agent, and the like. Sulfur-based crosslinking agent (sulfur-based vulcanizing agent) among these examples is preferably applied to a rubber composition for a tire.

A content of the crosslinking agent is not particularly restricted and can be appropriately selected according to the purpose but is preferably in the range of 0.1 to 20 parts by mass with respect to 100 parts by mass of the rubber component.

A vulcanization accelerator may be used in combination with the vulcanizing agent. Examples of the vulcanization accelerator include guanidine based, aldehyde-amine based, aldehyde-ammonium based, thiazole based, sulfonamide based, thiourea based, thiuram based, dithiocarbamate based, xanthate based compounds, and the like.

Further, other known additives such as a softener, a vulcanization accelerator aid, a coloring agent, a fire retardant, a lubricant, a foaming agent, a plasticizer, a processing aid, an antioxidant, an antiaging agent, a scorch protection agent, a UV protection agent, an antistatic agent, an anti-coloring agent, and the like may optionally be used in the rubber composition of the present disclosure according to the applications.

The rubber composition of the present disclosure is applicable to, other than a tire described below, a rubber damper, quake-absorbing rubber, a belt such as a conveyor belt, a rubber crawler, hoses of various types, and the like.

Resin Composition

A resin composition of the present disclosure characteristically contains the multi-component copolymer described above. The resin composition of the present disclosure exhibits reduced heat generation in a low strain region thereof.

The resin composition of the present disclosure contains the aforementioned multi-component copolymer as a resin component and optionally may further contain other resin components and various types of additives.

In the present disclosure, the multi-component copolymer is regarded as a resin component and a content of the multi-component copolymer in the entire resin components is preferably≥10 mass % in a case where the resin composition contains the multi-component copolymer.

Examples of the "other resin components" mentioned above include: a thermoplastic resin such as polyethylene, polypropylene, polystyrene, polyvinyl chloride, polyamide, polycarbonate, polyoxymethylene, polyphenylene ether, and the like; and a thermocurable resin such as phenol resin, epoxy resin, urea resin, melamine resin, and the like.

Further, examples of the "additives" mentioned above include an antistatic agent, a lubricant, a nucleating agent, a tackifier, an antifogging agent, a mold release agent, a plasticizer, a filler, an antioxidant, a pigment, a dye, a flavoring agent, a fire retardant, and the like.

Tire

A tire of the present disclosure characteristically employs the aforementioned rubber composition. The tire of the present disclosure therefore exhibits reduced heat generation in a low strain region thereof, as well as low rolling resistance.

A portion of a tire to which the rubber composition of the present disclosure is to be applied is not particularly limited and the tire portion can be appropriately selected according to the purpose. Examples of the tire portion include a tread, a base tread, a sidewall, side reinforcing rubber, a bead filler, and the like.

The tire of the present disclosure can be manufactured by a conventional method. For example, a desired tire such as a pneumatic tire can be manufactured by: sequentially laminating members generally for use in tire production such as a carcass layer, a belt layer, a tread layer made of the unvulcanized rubber composition and/or cords on a tire building drum; removing the drum, to obtain a green tire; and subjecting the green tire to heating and vulcanization according to the conventional method.

Resin Product

A resin product of the present disclosure characteristically uses the resin composition described above. The resin product of the present disclosure exhibits reduced heat generation in a low strain region thereof.

Application of the resin product of the present disclosure is not particularly restricted and the resin product is applicable to various articles each having a resin section in at least a portion thereof.

EXAMPLES

The present disclosure will be described further in detail by Examples hereinafter. The present disclosure is not restricted by any means by these Examples.

Example 1

A copolymer is synthesized by: charging 55 g of styrene and 870 g of toluene into a thoroughly dry 2000 mL pressure-resistant stainless reactor;

charging, on the other hand, 0.05 mmol of ((1-benzyldimethylsilyl-3-methyl)indenyl)bis(bis(dimethylsilyl)amide) gadolinium complex $\{(1BnMe_2Si-3-Me)C_9H_5Gd[N(SiHMe_2)_2]_2\}$, 0.05 mmol of dimethylanilinium tetrakis(pentafluorophenyl)borate [$Me_2NHPhB(C_6F_5)_4$], 0.3 mmol of trimethylaluminum, and 0.14 mmol of disobutylaluminum hydride into a glass vessel in a glovebox under nitrogen atmosphere and dissolving the substances in 30 g of toluene, to obtain a catalyst solution;

adding the catalyst solution thus obtained, to the pressure-resistant stainless reactor, and heating the mixture in the reactor to 75° C.;

then carrying out copolymerization by adding ethylene to the pressure-resistant stainless reactor at pressure of the ethylene: 1.6 MPa and charging 80 g of a toluene solution containing 25 g of 1,3-butadiene into the reactor over 4 hours;

stopping the copolymerization reaction by adding an isopropanol solution (1 mL) of 5 mass %, 2,2-methylene-bis(4-ethyl-6-t-butylphenol) (NS-5) to the pressure-resistant stainless reactor; and isolating a copolymer by using a large amount of methanol and vacuum-drying the resulting copolymer at 50° C., thereby obtaining a copolymer of Example 1.

Example 2

A copolymer is synthesized by: charging 44 g of styrene and 870 g of toluene into a thoroughly dry 2000 mL pressure-resistant stainless reactor;

charging, on the other hand, 0.05 mmol of ((1-benzyldimethylsilyl-3-methyl)indenyl)bis(bis(dimethylsilyl)amide) gadolinium complex $\{(1-BnMe_2Si-3-Me)C_9H_5Gd[N(SiHMe_2)_2]_2\}$, 0.05 mmol of dimethylanilinium tetrakis(pentafluorophenyl)borate [$Me_2NHPhB(C_6F_5)_4$], 0.3 mmol of trimethylaluminum, and 0.14 mmol of disobutylaluminum hydride into a glass vessel in a glovebox under nitrogen atmosphere and dissolving the substances in 30 g of toluene, to obtain a catalyst solution;

adding the catalyst solution thus obtained, to the pressure-resistant stainless reactor, and heating the mixture in the reactor to 75° C.;

then carrying out copolymerization by adding ethylene to the pressure-resistant stainless reactor at pressure of the ethylene: 1.2 MPa and charging 80 g of a toluene solution containing 25 g of 1,3-butadiene into the reactor over 4 hours;

stopping the copolymerization reaction by adding an isopropanol solution (1 mL) of 5 mass % 2,2-methylene-bis(4-ethyl-6-t-butylphenol) (NS-5) to the pressure-resistant stainless reactor; and isolating a copolymer by using a large amount of methanol and vacuum-drying the resulting copolymer at 50° C., thereby obtaining a copolymer of Example 2.

Example 3

A copolymer is synthesized by: charging 33 g of styrene and 870 g of toluene into a thoroughly dry 2000 mL pressure-resistant stainless reactor;

charging, on the other hand, 0.05 mmol of ((1-benzyldimethylsilyl-3-methyl)indenyl)bis(bis(dimethylsilyl)amide) gadolinium complex $\{(1-BnMe_2Si_{-3}-Me)C_9H_5Gd[N(SiHMe_2)_2]_2\}$, 0.05 mmol of dimethylanilinium tetrakis(pentafluorophenyl)borate [$Me_2NHPhB(C_6F_5)_4$], 0.3 mmol of trimethylaluminum, and 0.14 mmol of disobutylaluminum hydride into a glass vessel in a glovebox under nitrogen atmosphere and dissolving the substances in 30 g of toluene, to obtain a catalyst solution;

adding the catalyst solution thus obtained, to the pressure-resistant stainless reactor, and heating the mixture in the reactor to 75° C.;

then carrying out copolymerization by adding ethylene to the pressure-resistant stainless reactor at pressure of the ethylene: 1.2 MPa and charging 80 g of a toluene solution containing 25 g of 1,3-butadiene into the reactor over 4 hours;

stopping the copolymerization reaction by adding an isopropanol solution (1 mL) of 5 mass % 2,2-methylene-bis(4-ethyl-6-t-butylphenol) (NS-5) to the pressure-resistant stainless reactor; and isolating a copolymer by using a large amount of methanol and vacuum-drying the resulting copolymer at 50° C., thereby obtaining a copolymer of Example 3.

Comparative Example 1

A copolymer is synthesized by: charging 55 g of styrene and 870 g of toluene into a thoroughly dry 2000 mL pressure-resistant stainless reactor;

charging, on the other hand, 0.05 mmol of ((1-benzyldimethylsilyl-3-methyl)indenyl)bis(bis(dimethylsilyl)amide)

gadolinium complex {(1-BnMe$_2$Si-3-Me)C$_9$H$_5$Gd[N(SiHMe$_2$)$_2$]$_2$}, 0.05 mmol of dimethylanilinium tetrakis(pentafluorophenyl)borate [Me$_2$NHPhB(C$_6$F$_5$)$_4$], 0.3 mmol of trimethylaluminum, and 0.35 mmol of disobutylaluminum hydride into a glass vessel in a glovebox under nitrogen atmosphere and dissolving the substances in 30 g of toluene, to obtain a catalyst solution;

adding the catalyst solution thus obtained, to the pressure-resistant stainless reactor, and heating the mixture in the reactor to 75° C.;

then carrying out copolymerization at 75° C. for 4 hours in total by adding ethylene to the pressure-resistant stainless reactor at pressure of the ethylene: 1.0 MPa and charging 8 g of a toluene solution containing 2 g of 1,3-butadiene, i.e., 1,3-butadiene, every 24 minutes such that 80 g of a toluene solution containing 20 g of 1,3-butadiene is eventually charged;

stopping the copolymerization reaction by adding an isopropanol solution (1 mL) of 5 mass % 2,2-methylene-bis(4-ethyl-6-t-butylphenol) (NS-5) to the pressure-resistant stainless reactor; and isolating a copolymer by using a large amount of methanol and vacuum-drying the resulting copolymer at 50° C., thereby obtaining a copolymer of Comparative Example 1.

Analysis of Multi-Component Copolymers

The number average molecular weight (Mn), the weight average molecular weight (Mw), the molecular weight distribution (Mw/Mn), contents (mol %) of ethylene unit, butadiene unit and styrene unit, a degree of crystallinity, the melting point (Tm), and the glass transition temperature (Tg) are measured for each of the multi-component copolymers thus obtained, by the methods described below, respectively, so that a main chain structure of the multi-component copolymer is determined.

(1) Number Average Molecular Weight (Mn),
Weight Average Molecular Weight (Mw), and
Molecular Weight Distribution (Mw/Mn)

The number average molecular weight (Mn), the weight average molecular weight (Mw), and the molecular weight distribution (Mw/Mn) in terms of polystyrene standard are determined relative to monodisperse polystyrene as a standard reference material, respectively, for each of the multi-component copolymers, by using gel permeation chromatography [GPC: HLC-8121GPC/HT manufactured by Tosoh Corporation, column: GMH$_{HR}$-H(S)HT×2 manufactured by Tosoh Corporation, detector: a differential refractive index detector (RI)]. The measurement temperature is 40° C.

(2) Contents of ethylene Unit, butadiene Unit and styrene Unit

Contents (mol %) of ethylene unit, butadiene unit and styrene unit in each of the multi-component copolymers are determined from integration ratios of respective peaks in $^1$H-NMR spectrum (100° C., d-tetrachloroethane reference: 6 ppm).

(3) Degree of crystallinity

Each of the multi-component copolymer samples is heated from −150° C. to 150° C. at a temperature-increasing rate of 10° C./minute, so that an endothermic peak energy (endothermic energy at the endothermic peak) (ΔH$_1$) in the range of 0° C. to 100° C. and an endothermic peak energy (ΔH$_2$) in the range of 100° C. to 120° C., of the multi-component copolymer sample, in the heating process are measured.

Further, crystal melting energy (ΔH$_0$) of polyethylene having a crystal component ratio: 100% is measured in a manner similar to the measurement of ΔH$_1$ and ΔH$_2$.

A degree of crystallinity (C$_{0-100}$ (%)) derived from ethylene unit (non-conjugated olefin unit) in the range of 0° C. to 100° C. is calculated from a ratio (ΔH$_1$/ΔH$_0$) of the endothermic peak energy (ΔH$_1$) in the range of 0° C. to 100° C. of the multi-component copolymer sample with respect to the crystal melting energy (ΔH$_0$) of the polyethylene. Further, a degree of crystallinity (C$_{100-120}$ (%)) derived from ethylene unit (non-conjugated olefin unit) in the range of 100° C. to 120° C. is calculated from a ratio (ΔH$_2$/ΔH$_0$) of the endothermic peak energy (ΔH$_2$) in the range of 100° C. to 120° C. of the multi-component copolymer sample with respect to the crystal melting energy (ΔH$_0$) of the polyethylene. Then, a ratio of [(C$_{100-120}$/C$_{0-100}$) ×100] is calculated based on the degree of crystallinity (C$_{0-100}$(% and the degree of crystallinity (C$_{100-120}$ (%) thus determined.

The endothermic peak energy of the multi-component copolymer sample and the crystal melting energy of polyethylene are measured, respectively, by a differential scanning calorimeter (DSC) "DSCQ2000" manufactured by TA Instruments Japan. The measurement results are shown in Table 1. Further, the figure shows a DSC chart of the multi-component copolymer of Example 1 for reference.

(4) Melting Point (Tm)

Melting point (T$_m$) of each of the multi-component copolymer samples is measured according to JIS K 7121-1987 by using a differential scanning calorimeter (DSC) "DSCQ2000" manufactured by TA Instruments Japan.

(5) Glass Transition Temperature (Tg)

The glass transition temperature (T$_g$) of each of the multi-component copolymer samples is measured according to JIS K 7121-1987 by using a differential scanning calorimeter (DSC) "DSCQ2000" manufactured by TA Instruments Japan.

(6) Confirmation of Structure of Main Chain $^{13}$C-NMR spectrum is measured for each of the multi-component copolymers thus synthesized. It is confirmed that each of the multi-component copolymers has a main chain constituted exclusively of acyclic structures because no peak is observed in the range of 10 ppm to 24 ppm in the $^{13}$C-NMR spectrum chart thereof.

TABLE 1

|  |  | Example 1 | Example 2 | Example 3 | Comp. Ex. 1 |
|---|---|---|---|---|---|
| Number average molecular weight (Mn) | ×10$^3$ | 163 | 134 | 137 | 92 |
| Weight average molecular weight (Mw) | ×10$^3$ | 399 | 354 | 345 | 223 |

TABLE 1-continued

|  |  | Example 1 | Example 2 | Example 3 | Comp. Ex. 1 |
|---|---|---|---|---|---|
| Molecular weight distribution (Mw/Mn) | — | 2.4 | 2.7 | 2.5 | 2.4 |
| Content of ethylene unit | mol % | 84.6 | 85.7 | 88.1 | 82.8 |
| Content of butadiene unit | mol % | 10.8 | 9.4 | 7.4 | 13.9 |
| Content of styrene unit | mol % | 4.6 | 4.9 | 4.5 | 3.3 |
| Degree of crystallinity at 0° C.-100° C. ($C_{0-100}$) | % | 12 | 16 | 20 | 12 |
| Degree of crystallinity at 100° C.-120° C. ($C_{100-120}$) | % | 2.4 | 3.0 | 4.1 | 3.1 |
| Ratio of $C_{100-200}$ with respect to $C_{0-100}$ [$(C_{100-120}/C_{0-100}) \times 100$] | % | 20 | 19 | 21 | 25 |
| Melting point (Tm) | ° C. | 63 | 67 | 76 | 68 |
| Glass transition temperature (Tg) | ° C. | −28 | −29 | −25 | −22 |

It is understood from Table 1 that each of the copolymers of Examples 1 to 3 exhibits a significantly low ratio [$(C_{100-120}/C_{0-100}) \times 100$] of crystallinity ($C_{100-120}$) derived from the ethylene unit at 100-120° C. with respect to crystallinity ($C_{0-100}$) derived from the ethylene unit at 0-100° C., as measured by a differential scanning calorimeter (DSC).

Preparation of Rubber Composition and Evaluation Thereof

Rubber composition samples are manufactured by using a conventional Banbury mixer according to the blend formulation shown in Table 2. The loss tangent (tan δ) is measured for each of the rubber composition samples thus prepared, by the method described below. The results are shown in Table 2.

(7) Loss Tangent (Tan δ)

Tan δ (loss tangent) at 50° C. is measured for each of the vulcanized rubber samples respectively obtained by subjecting the rubber composition samples to vulcanization at 145° C. for 33 minutes, by using a viscoelastic testing device "ARES" manufactured by Rheometric Scientific, Inc. under the conditions of strain: 0.3% and frequency: 10 Hz. The tan δ value thus measured is converted to a "tan δ (index)" by the formula shown below.

tan δ (index)={(tan δ of the rubber composition of Comp. Example 4)/(tan δ of the rubber composition of Example/Comp. Example)}×100

The larger index represents the smaller tan δ, i.e., the more reduced heat generation at a low strain region (0.3% tan δ) and thus the better performance of the rubber composition.

TABLE 2

|  |  |  | Comp. Example 2 | Comp. Example 3 | Example 4 | Example 5 | Example 6 | Comp. Example 4 |
|---|---|---|---|---|---|---|---|---|
| Blend formulation | SBR *1 | Parts by mass | 100 | 100 | — | — | — | — |
|  | Multi-component copolymer of Example 1 |  | — | — | 100 | — | — | — |
|  | Multi-component copolymer of Example 2 |  | — | — | — | 100 | — | — |
|  | Multi-component copolymer of Example 3 |  | — | — | — | — | 100 | — |
|  | Multi-component copolymer of Comp. Example 1 |  | — | — | — | — | — | 100 |
|  | Silica *2 |  | 55 | 55 | 55 | 55 | 55 | 55 |
|  | Silane coupling agent *3 |  | 4 | 4 | 4 | 4 | 4 | 4 |
|  | Oil *4 |  | 10 | 10 | 10 | 10 | 10 | 10 |
|  | Stearic acid |  | 2 | 2 | 2 | 2 | 2 | 2 |
|  | Wax *5 |  | 2 | 2 | 2 | 2 | 2 | 2 |
|  | Antioxidant 6C *6 |  | 1 | 1 | 1 | 1 | 1 | 1 |
|  | Sulfur |  | 1.2 | 1.44 | 1.2 | 1.2 | 1.2 | 1.2 |
|  | Vulcanization accelerator DPG *7 |  | 1.12 | 1.34 | 1.12 | 1.12 | 1.12 | 1.12 |
|  | Vulcanization accelerator MBTS *8 |  | 1.6 | 1.92 | 1.6 | 1.6 | 1.6 | 1.6 |
|  | Vulcanization accelerator NS *9 |  | 0.56 | 0.672 | 0.56 | 0.56 | 0.56 | 0.56 |
|  | Zinc white *10 |  | 2.5 | 2.5 | 2.5 | 2.5 | 2.5 | 2.5 |
| Evaluation | tanδ at strain: 0.3% | Index | 83 | 91 | 125 | 126 | 126 | 100 |

*1 SBR: Styrene-butadiene copolymer rubber, product name "#0202" manufactured by JSR Corporation
*2 Silica: product name "Nipsil AQ" manufactured by Toso Silica Corporation
*3 Silane coupling agent bis(3-triethoxysilylpropyl)disulfide (the average sulfur chain length: 2.35), product name "Si75 ®" manufactured by Evonic Industries, AG
*4 Oil: Petroleum-based hydrocarbon process oil, product name "DAIANA PROCESS OIL NS-28" manufactured by Idemitsu Kosan Co., Ltd.
*5 Wax: Microcrystalline wax, product name "SUNTIGHT" manufactured by Seiko Chemical Co., Ltd.
*6 Antioxidant 6C: N-(1,3-dimethylbutyl)-N'-phenyl-p-phenylenediamine, product name "Nocrac 6C" manufactured by Ouchi-Shinko Chemical Industrial Co., Ltd.
*7 Vulcanization accelerator DPG: 1,3-diphenylguanidine, product name "Sanceler D" manufactured by SANSHIN CHEMICAL INDUSTRY CO., LTD.
*8 Vulcanization accelerator MBTS: di-2-benzothiazolyl disulfide, product name "Sanceler DM" manufactured by SANSHIN CHEMICAL INDUSTRY CO., LTD.
*9 Vulcanization accelerator NS: N-tert-butyl-2-benzothiazolylsulphenamide, product name "Sanceler NS" manufactured by SANSHIN CHEMICAL INDUSTRY CO., LTD.
*10 Zinc white, manufactured by HAKUSUI TECH CO., LTD.

It is understood from Table 2 that the rubber compositions of Examples 4 to 6 containing the multi-component copolymers of Examples 1 to 3, respectively, unanimously exhibit significantly reduced heat generation in low strain regions thereof.

INDUSTRIAL APPLICABILITY

The multi-component copolymer of the present disclosure is applicable as a rubber component of a rubber composition and/or a resin component of a resin composition. The rubber composition of the present disclosure is applicable to various types of rubber articles including a tire. The resin composition of the present disclosure is applicable to various types of resin products.

The invention claimed is:

1. A resin composition, characterized in that it contains a multi-component copolymer, the multi-component copolymer comprising a non-conjugated olefin unit, a conjugated diene unit, and an aromatic vinyl unit, characterized in that:
a ratio $[(C_{100\text{-}120}/C_{0\text{-}100}) \times 100]$ of crystallinity $(C_{100\text{-}120})$ derived from the non-conjugated olefin unit at 100-120° C. with respect to crystallinity $(C_{0\text{-}100})$ derived from the non-conjugated olefin unit at 0-100° C., as measured by a differential scanning calorimeter (DSC), is 23% or less.

2. The resin composition of claim 1, wherein said crystallinity $(C_{0\text{-}100})$ derived from the non-conjugated olefin unit at 0-100° C. is 10% or more.

3. The resin composition of claim 1, wherein a content of the non-conjugated olefin unit is in the range of 40 to 97 mol %, a content of the conjugated diene unit is in the range of 1 to 50 mol %, and a content of the aromatic vinyl unit is in the range of 2 to 35 mol %.

4. The resin composition of claim 1, wherein the melting point thereof measured by a differential scanning calorimeter (DSC) is in the range of 50 to 90° C.

5. The resin composition of claim 1, wherein the glass transition temperature thereof measured by a differential scanning calorimeter (DSC) is 0° C. or lower.

6. The resin composition of claim 1, wherein a main chain of the multi-component copolymer is constituted exclusively of an acyclic structure.

7. A resin product, characterized in that it uses the resin composition of claim 1.

* * * * *